(12) United States Patent
Iwata

(10) Patent No.: US 10,093,365 B2
(45) Date of Patent: Oct. 9, 2018

(54) WORK VEHICLE

(71) Applicant: YANMAR CO., LTD., Osaka-shi, Osaka (JP)

(72) Inventor: Akimichi Iwata, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 15/488,745

(22) Filed: Apr. 17, 2017

(65) Prior Publication Data

US 2017/0217510 A1    Aug. 3, 2017

Related U.S. Application Data

(63) Continuation of application No. PCT/JP2015/078374, filed on Oct. 6, 2015.

(30) Foreign Application Priority Data

Oct. 15, 2014  (JP) .................................. 2014-211117
May 26, 2015  (JP) .................................. 2015-106811

(51) Int. Cl.
| | | |
|---|---|---|
| B62D 49/06 | (2006.01) |
| B60R 11/02 | (2006.01) |
| B60R 13/08 | (2006.01) |
| B60S 1/08 | (2006.01) |
| B62D 1/185 | (2006.01) |
| B62D 1/187 | (2006.01) |
| B60S 1/04 | (2006.01) |
| B62D 1/18 | (2006.01) |

(52) U.S. Cl.
CPC .......... B62D 49/0692 (2013.01); B60R 11/02 (2013.01); B60R 13/0853 (2013.01); B60S 1/0463 (2013.01); B60S 1/08 (2013.01); B62D 1/18 (2013.01); B62D 1/185 (2013.01); B62D 1/187 (2013.01); *B60R 11/0258* (2013.01)

(58) Field of Classification Search
CPC ...... B62D 49/0692; B62D 1/18; B62D 1/187; B62D 1/185; B60S 1/0463; B60S 1/08; B60R 13/0853; B60R 11/02; B60R 11/0258
See application file for complete search history.

(56) References Cited

U.S. PATENT DOCUMENTS 3,816,836 A * 6/1974 Smith .................. H01O 1/1271
                                                    174/359
3,816,837 A * 6/1974 Smith .................. H01Q 1/3291
                                                    180/90

(Continued)

FOREIGN PATENT DOCUMENTS

JP    2001-143114 A    5/2001
JP    2003-175802 A    6/2003

(Continued)

*Primary Examiner* — Darlene P Condra
(74) *Attorney, Agent, or Firm* — Norton Rose Fulbright US LLP

(57) ABSTRACT

A work vehicle includes an antenna which executes communication with an external portion and a communication terminal device which is electrically connected to the antenna. The antenna and the communication terminal device are arranged within a dash board which is provided in a rising manner so as to bury a steering column where a control steering wheel is arranged.

5 Claims, 31 Drawing Sheets

(56) References Cited

U.S. PATENT DOCUMENTS

| | | | | |
|---|---|---|---|---|
| 3,896,448 | A * | 7/1975 | Killen | B60K 37/00 |
| | | | | 180/90 |
| 5,682,168 | A * | 10/1997 | James | H01Q 1/3275 |
| | | | | 343/711 |
| 5,938,704 | A * | 8/1999 | Torii | G05D 1/0265 |
| | | | | 180/168 |
| 6,011,518 | A * | 1/2000 | Yamagishi | H01Q 1/3266 |
| | | | | 343/700 MS |
| 6,029,764 | A * | 2/2000 | Schubert | B62D 33/0608 |
| | | | | 180/89.12 |
| 6,208,305 | B1 * | 3/2001 | King | B60R 16/0231 |
| | | | | 343/711 |
| 6,476,778 | B1 * | 11/2002 | Hussaini | H01Q 1/10 |
| | | | | 343/702 |
| 7,161,471 | B2 * | 1/2007 | Schulz | B60R 25/00 |
| | | | | 307/10.1 |
| 7,443,353 | B2 * | 10/2008 | Fujimoto | H01Q 1/3233 |
| | | | | 343/713 |
| 2016/0031448 | A1 * | 2/2016 | Sakai | G05B 9/02 |
| | | | | 701/23 |
| 2016/0208914 | A1 * | 7/2016 | Kondou | F16H 61/16 |
| 2017/0210386 | A1 * | 7/2017 | Kou | B60W 30/18172 |

FOREIGN PATENT DOCUMENTS

| | | | |
|---|---|---|---|
| JP | 2005-176622 A | 7/2005 | |
| JP | 2013-112104 A | 6/2013 | |
| JP | 2013-181406 A | 9/2013 | |
| JP | 2014-015058 A | 1/2014 | |
| JP | 2015-020675 A | 2/2015 | |
| WO | WO-2010017254 A2 * | 2/2010 | ........... B29C 70/025 |

\* cited by examiner

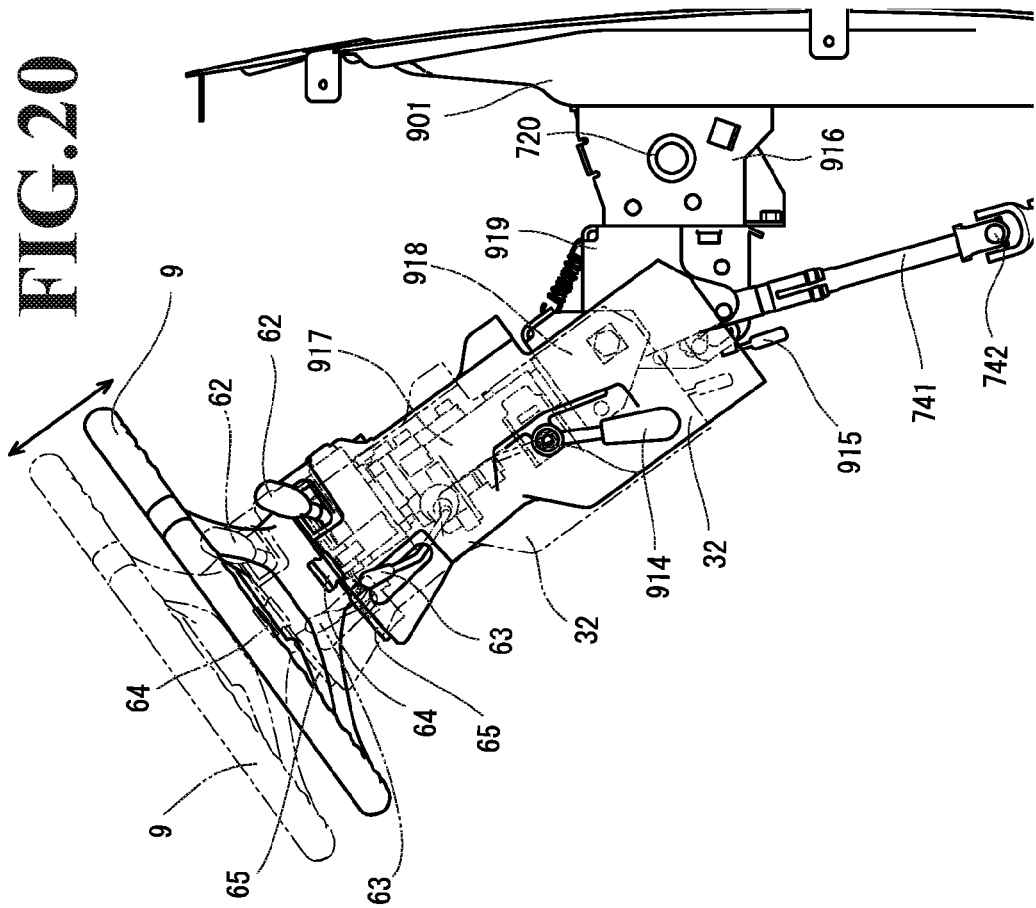
FIG.20
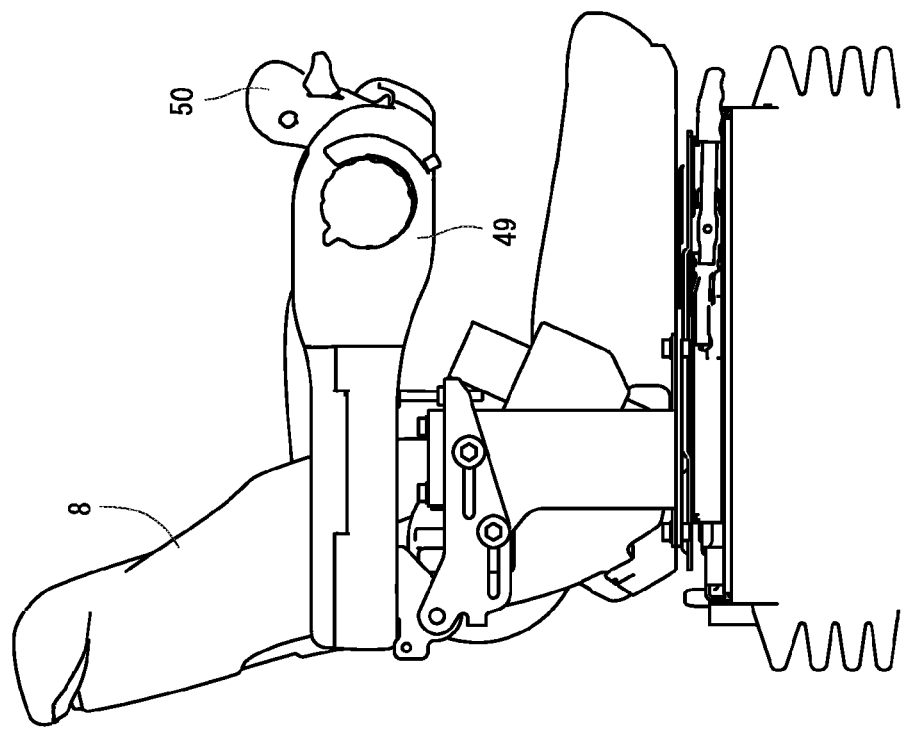

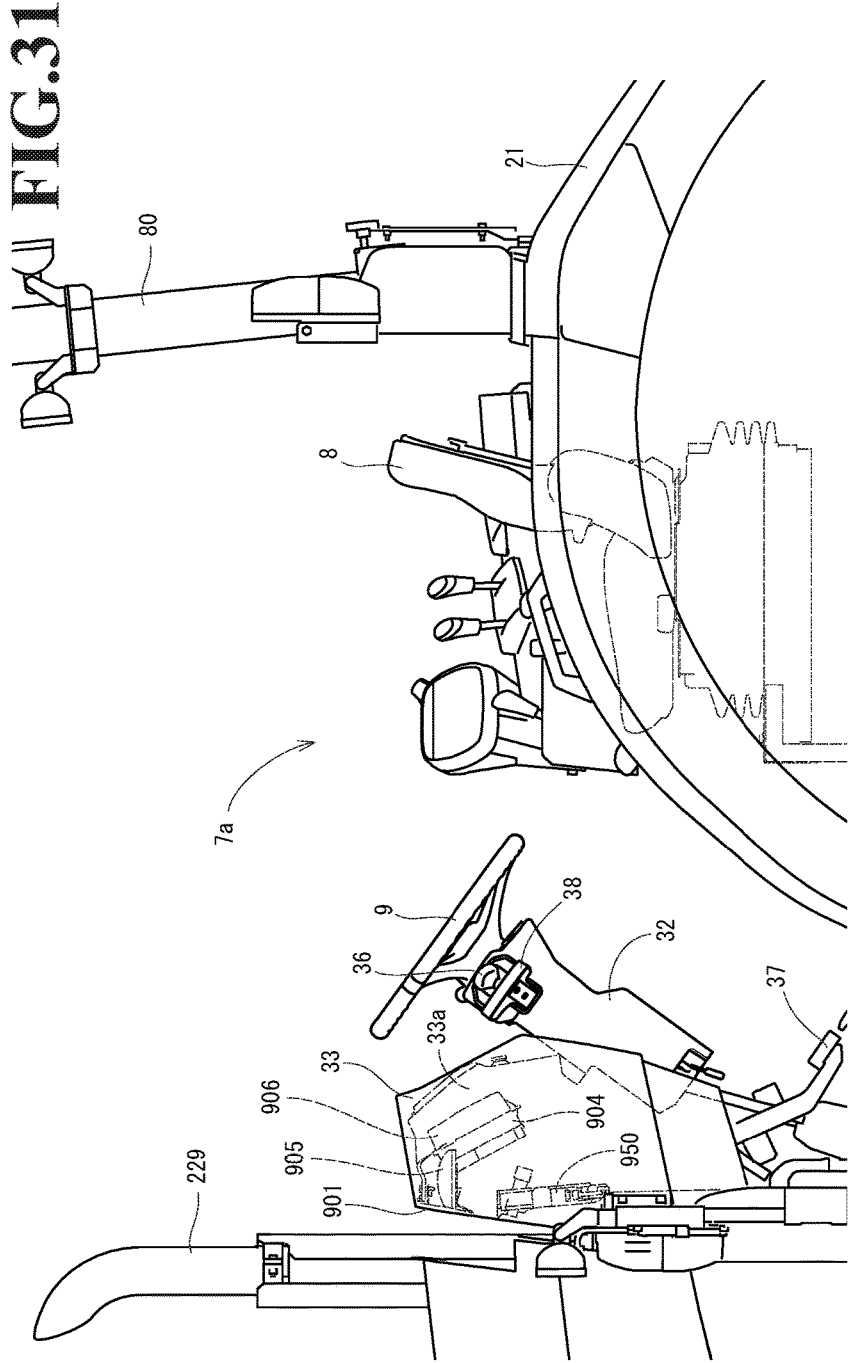

WORK VEHICLE

CROSS-REFERENCE TO RELATED APPLICATIONS

The present application is a continuation application of International Application No. PCT/JP2015/078374, filed Oct. 6, 2015, which claims priority to Japanese Patent Application No. 2014-211117, filed Oct. 15, 2014 and Japanese Patent Application No. 2015-106811, filed May 26, 2015. The contents of these applications are incorporated herein by reference in their entirety.

BACKGROUND OF THE INVENTION

The present invention relates to a work vehicle.

In the work vehicle such as the tractor or the wheel loader, there are arranged around a control seat a control steering wheel for operating to steer a travel machine body and a plurality of lever members for setting and adjusting a traveling state of the travel machine body, taking an operability into consideration. For example, the tractor for the agricultural work has a main transmission lever, a sub transmission lever, a forward and backward movement switching lever, and a PTO shift lever, as a plurality of lever members (refer to Japanese Unexamined Patent Application Publication No. 2013-112104). The main transmission lever is structured such as to operate to change a vehicle speed of the travel machine body, and the sub transmission lever is structured such as to set and retain a transmission output of a transmission to a predetermined range. The forward and backward movement switching lever is structured such as to operate to switch a moving direction of the travel machine body to a forward movement and a backward movement, and the PTO shift lever is structured such as to operate to shift an output (a PTO driving force) to the working machine.

Further, the work vehicle mounts on the travel machine body a cabin which is internally provided with various operating instruments including a control steering wheel and a control seat (refer to Japanese Unexamined Patent Application Publication No. 2013-112104 and Japanese Patent No. 3657249). The cabin mounting type work vehicle is provided with a wiper for removing soil on a windshield for securing visibility of a control operator (refer to Japanese Patent No. 3657249). Further, in the work vehicle, there has been proposed a work vehicle in which a current position of its own vehicle is confirmed by communicating with a GPS (global positioning system) satellite and traveling information and working information are transmitted together with the positional information of its own vehicle to an external portion by utilizing a communication line (refer to Japanese Unexamined Patent Application Publication No. 2015-020675).

SUMMARY OF THE INVENTION

In the meantime, in the structure in which the wiper is provided in the outer side of the windshield such as this kind of work vehicle, a wiper driving mechanism including a wiper motor driving the wiper is necessary, and there has been a problem that a support portion for the wiper driving mechanism can not be easily secured. Further, since the windshield has been conventionally structured such as to be separated into three sections, an assembling work such as a bonding work is complicated, and a forward visibility is inhibited by a blind corner caused by the bonded portion.

Further, in this kind of work vehicle, a plurality of switches such as a DPF (diesel particulate filter) regeneration switch, a working switch, and a one-touch automatic switch are provided concentrically in a front surface of a control seat. Therefore, there has been a problem that an operator can not easily view the switches because the switches are under screen of a control steering wheel or an operation lever. Further, in this kind of work vehicle, there is a work vehicle structured such as to be provided with a tilt lever and a telescopic lever for adjusting a posture of the control steering wheel in conformity to a driving posture of the operator. However, if the tilt lever or the telescopic lever is erroneously operated, there has been a problem that the posture of the control steering wheel comes to a posture which cannot be expected by the operator.

In the work vehicle in Japanese Unexamined Patent Application Publication No. 2015-020675, an antenna is arranged in an external portion of the vehicle, for example, an upper portion of the vehicle. Therefore, a wiring electrically connecting the antenna and a communication module becomes long, and a wiring work and a maintenance work are complicated. Further, since the antenna is provided in the external portion of the vehicle, any third person can touch the wiring to the antenna. As a result, there is a risk that the wiring between the antenna and the communication module is cut off or stolen as the case may be.

A technical object of the present invention is to provide a tractor to which an improvement is applied as a result of making a study of the actual condition as mentioned above.

A work vehicle according to one aspect of the present invention is structured such that an antenna and a communication terminal device are fixed to a rear surface of an air-cut plate, the antenna executing communication with an external portion and the communication terminal device being electrically connected to the antenna, and the antenna and the communication terminal device are arranged within a dash board which is provided in a rising manner so as to bury a steering column.

Further, a meter panel may be fixed to the dash board, a meter controller electrically connected to the meter panel may be integrally constructed with the meter panel, and the meter controller may be arranged within the dash board so as to face to the communication terminal device. The meter controller can be compactly installed within the dash panel together with the communication terminal device and the antenna, the electric wiring can be formed as a short channel, and the wiring work can be easily carried out.

Further, the above work vehicle may be constructed by a work vehicle having a DPF regeneration switch, a working switch, and a one-touch automatic switch, wherein the DPF regeneration switch is provided on an upper surface of the steering column in a base portion of a control steering wheel, whereby the DPF regeneration switch is arranged in a field of vision of an operator under a straight moving work posture. As a result, the DPF regeneration switch does not get behind the control steering wheel or the operation lever, and the position of the DPF regeneration switch and the lighting display state can be easily viewed by the seating operator.

Further, the working switch and the one-touch automatic switch may be arranged on the upper surface of the steering column which is bilaterally symmetrical about the control steering wheel shaft, in the upper surface of the steering column. As a result, the positions of the working switch and the one-touch automatic switch can be easily viewed by the seating operator, and an erroneous operation can be reduced.

Further, the DPF regeneration switch, the working switch, and the one-touch automatic switch may be provided on the upper surface of the steering column in the base portion of the control steering wheel, the DPF regeneration switch is installed in an upper surface in one side of the steering column above a brake pedal, and the working switch and the one-touch automatic switch are installed so as to have a spoke of the control steering wheel arranged on a longitudinally center line of the travel machine body therebetween. As a result, it is possible to improve an operability of the DPF regeneration switch, the working switch, and the one-touch automatic switch, and it is possible to reduce the erroneous operation.

The work vehicle according to another aspect of the present invention may be constructed by a work vehicle having a wiper which is arranged in an outer side of a windshield, and a wiper driving mechanism which drives the wiper, wherein an air-cut plate is provided in a front surface side of a steering column where a control steering wheel is arranged, and the wiper driving mechanism is attached to the air-cut plate.

The work vehicle as mentioned above may be structured such that the wiper driving mechanism is firmly fixed to a rear surface of the air-cut plate, the windshield is provided in a tension manner in a front surface side of the air-cut plate, and a drive shaft of the wiper driving mechanism is passed through the air-cut plate and the windshield. Further, a sound insulation material may be provided in a tension manner by a sheet metal frame at a position which faces to the air-cut plate in the front surface of the windshield, and the drive shaft of the wiper driving mechanism may be passed through the sound insulation material.

The work vehicle may be structured such that a stepped collar is passed through a position where the windshield, the sound insulation material, and the sheet metal frame overlap, and a washer is detachably fastened to a small-diameter portion of the stepped collar, whereby the windshield, the sound insulation material, and the sheet metal frame are pinched and fixed by a large-diameter portion of the stepped collar and the washer. According to the structure mentioned above, the windshield and the sound insulation material can be closely attached, and it is possible to improve a sound proofing function and a vibration damping function of the windshield and further of a cabin having the windshield. The sound insulation material can be easily replaced by detaching the stepped collar and the washer, and a replacing work (a maintenance work) of the sound insulation material can be easily carried out. Further, the stepped collar to which an elastic material is fitted may be passed through a position where the windshield, the sound insulation material, and the sheet metal frame overlap. This structure contributes to a further improvement of the sound proofing function and the vibration damping function of the windshield and further of the cabin.

Further, the work vehicle may be constructed by a work vehicle having a tilt lever and a telescopic lever which adjust a posture of the control steering wheel, wherein the tilt lever and the telescopic lever are arranged in a sorting manner in right and left sides of a steering column where the control steering wheel is arranged. As a result, it is possible to reduce an erroneous operation of the tilt lever or the telescopic lever, and it is possible to easily prevent the posture of the control steering wheel from being changed to a posture which is not expected by the operator.

Further, the tilt lever may be installed in the left side of the steering column, and the telescopic lever is installed in the right side of the steering column. As a result, the operator can grip the tilt lever by a left hand, and grip the control steering wheel by a right hand, and it is possible to improve a tilt adjustment operability of the control steering wheel having a higher frequency than a telescopic adjustment operation.

Further, the work vehicle may be structured such that the posture of the steering column is changed working with a posture adjustment of the control steering wheel. As a result, a support position of a display lamp or a switch which are arranged in the upper surface side of the steering column is adjusted its position working with the control steering wheel, and the display lamp or the switch can be supported in the field of vision of the seating operator.

According to the embodiment of the present invention, the communication terminal device and the antenna can be arranged within the dash board to be close contact. As a result, it is possible to achieve the electrical connection between the communication terminal device and the antenna by the short channel, and it is possible to simplify the wiring work. Further, since the communication terminal device and the antenna are arranged in a place which can not be viewed from the outer side, it is possible to prevent access from the external portion by the third person, for example, it is possible to prevent the electric connection between the communication terminal device and the antenna from being cut or stolen.

According to the embodiment of the present invention, the DPF regeneration switch does not get behind the control steering wheel or the operation lever, and the position of the DPF regeneration switch and the lighting display state can be easily viewed by the seating operator. Further, it is possible to be easily viewed the positions of the working switch and the one-touch automatic switch by the seating operator, and it is possible to reduce the erroneous operation.

According to the embodiment of the present invention, it is possible to improve an assembling workability of the wiper and the wiper driving mechanism in spite of the structure in which the wiper driving mechanism can be compactly supported in an inner side of a meter display portion in an upper end portion of the air-cut plate. Further, a bonding work of the windshield can be omitted and it is possible to simplify an assembling work of the windshield in comparison with the structure in which the windshield is formed into three divisional sections. A design property can be improved. Further, since the sound insulation material is provided, it is possible to prevent an engine noise from being transmitted to the air-cut plate (the cabin) side, and it is possible to simplify a waterproof construction in a drive shaft attaching portion of the wiper driving mechanism.

According to the embodiment of the present invention, it is possible to reduce the erroneous operation of the tilt lever or the telescopic lever, and it is possible to easily prevent the posture of the control steering wheel from being changed to the posture which is not expected by the operator. Further, the operator grips the tilt lever by the left hand and grips the control steering wheel by the right hand, and it is possible to improve the tilt adjustment operability of the control steering wheel having the higher frequency than the telescopic adjustment operation. Further, since the support position of the display lamp or the switch which are arranged in the upper surface side of the steering column is adjusted its position working with the control steering wheel, the display lamp or the switch can be supported in the field of vision of the seating operator.

BRIEF DESCRIPTION OF THE DRAWINGS

FIG. 20 is a view showing a telescopic motion of a control steering wheel;

FIG. 31 is a left side elevational view around a control seat of the tractor according to the other embodiment.

DESCRIPTION OF THE EMBODIMENTS

Figure 1:
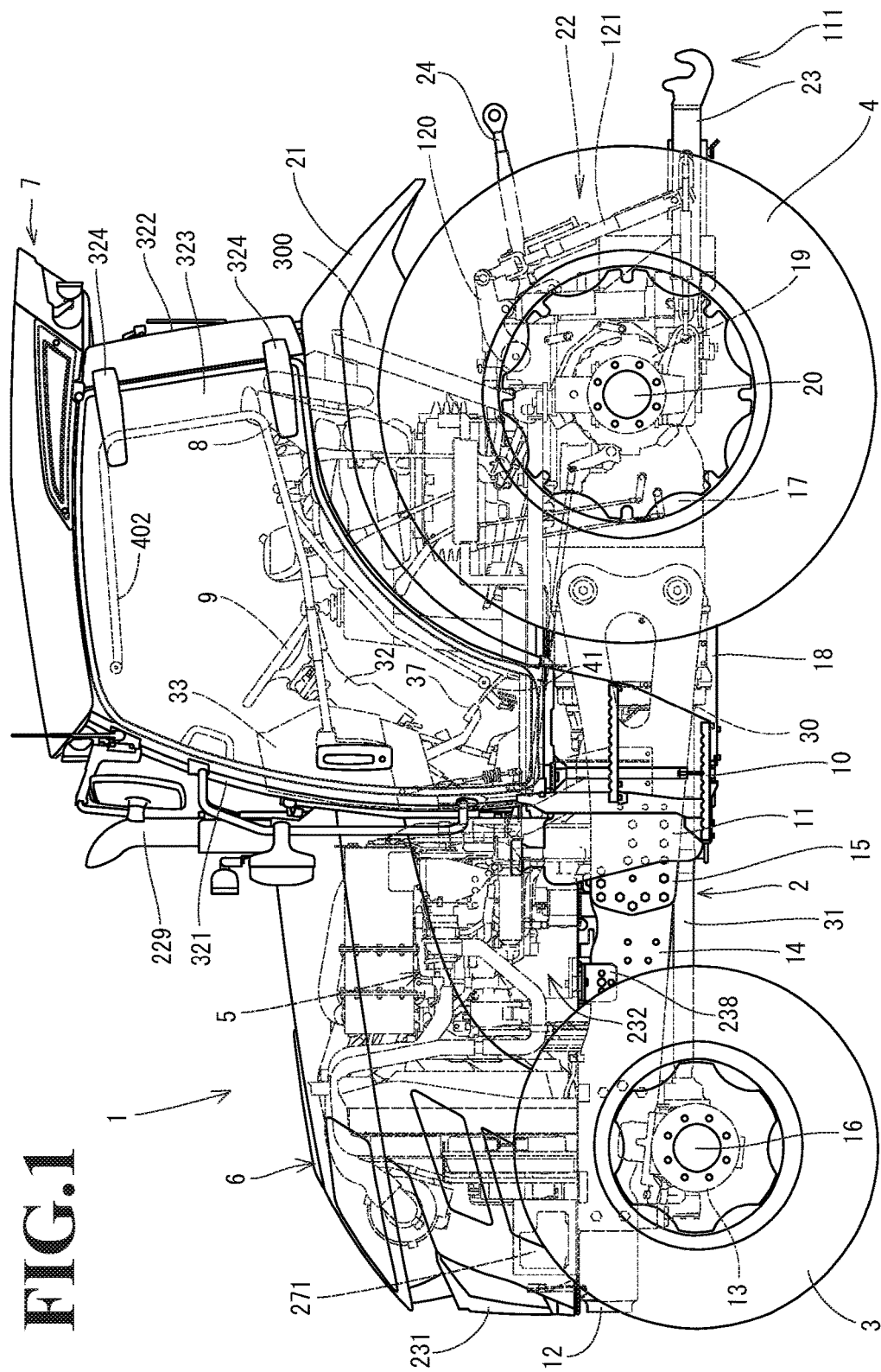
FIG. 1 is a left side elevational view of a tractor.

A description will be given below of an embodiment obtained by specifying the present invention on the basis of the accompanying drawings of a tractor for an agricultural work. As shown in FIGS. 1 to 8, a travel machine body 2 of a tractor 1 is supported by a pair of right and left front wheels 3 serving as a traveling portion and a pair of right and left rear wheels 4 serving as the traveling portion in the same manner. The pair of right and left rear wheels 4 correspond to a rear traveling portion. A diesel engine 5 (hereinafter, refer simply to as an engine) is mounted to a front portion of the travel machine body 2, and the tractor 1 is structured such as to travel forward and backward by driving the rear wheels 4 or the front wheels 3 by the engine 5. The engine 5 is covered with a hood 6. A cabin 7 is installed to an upper surface of the travel machine body 2. A control seat 8 and a control steering wheel 9 operating the front wheels 3 to steer are arranged in an inner portion of the cabin 7. Right and left outer sides of the cabin 7 are provided with steps 10 by which an operator gets on and off. A fuel tank 11 feeding fuel to the engine 5 is provided in a lower side of a bottom portion of the cabin 7.

The travel machine body 2 is constructed by an engine frame 14 which has a front bumper 12 and a front axle case 13, and right and left machine body frames 15 which are detachably fixed to a rear portion of the engine frame 14. Front axles 16 are rotatably protruded outward from both right and left end sides of the front axle case 13. The front wheels 3 are attached to both right and left end sides of the front axle case 13 via the front axles 16. A transmission case 17 for appropriately changing rotary power from the engine 5 and transmitting the rotary power to four front and rear wheels 3, 3, 4, and 4 is coupled to a rear portion of the machine body frame 15. A tank frame 18 is fastened by bolts to a lower surface side of the right and left machine body frames 15 and the transmission case 17, the tank frame 18 protruding outward to right and left and being formed into a rectangular frame plate in a bottom elevational view. The fuel tank 11 in the embodiment is separated into two right and left sections. The right and left tanks 11 are mounted in a sorting manner to upper surface sides of the right and left protruding portions of the tank frame 18. Right and left rear axle cases 19 are installed to right and left outer side surfaces of the transmission case 17 so as to protrude outward. Right and left rear axles 20 are inward inserted to the right and left rear axle cases 19 rotatably. The rear wheels 4 are attached to the transmission case 17 via the rear axles 20. The above of the right and left rear wheels 4 is covered with right and left rear fenders 21.

A hydraulic elevating mechanism 22 moving up and down a ground working machine (not shown), for example, a rotary tiller is detachably attached to a rear portion of the transmission case 17. The ground working machine is coupled to the rear portion of the transmission case 17 via a three-point link mechanism 111 which is constructed by right and left lower links 23 and a top link 24. A PTO shaft 25 for transmitting PTO driving force to the ground working machine such as the rotary tiller is provided in a rear side surface of the transmission case 17 so as to be protruded rearward.

Figure 13:
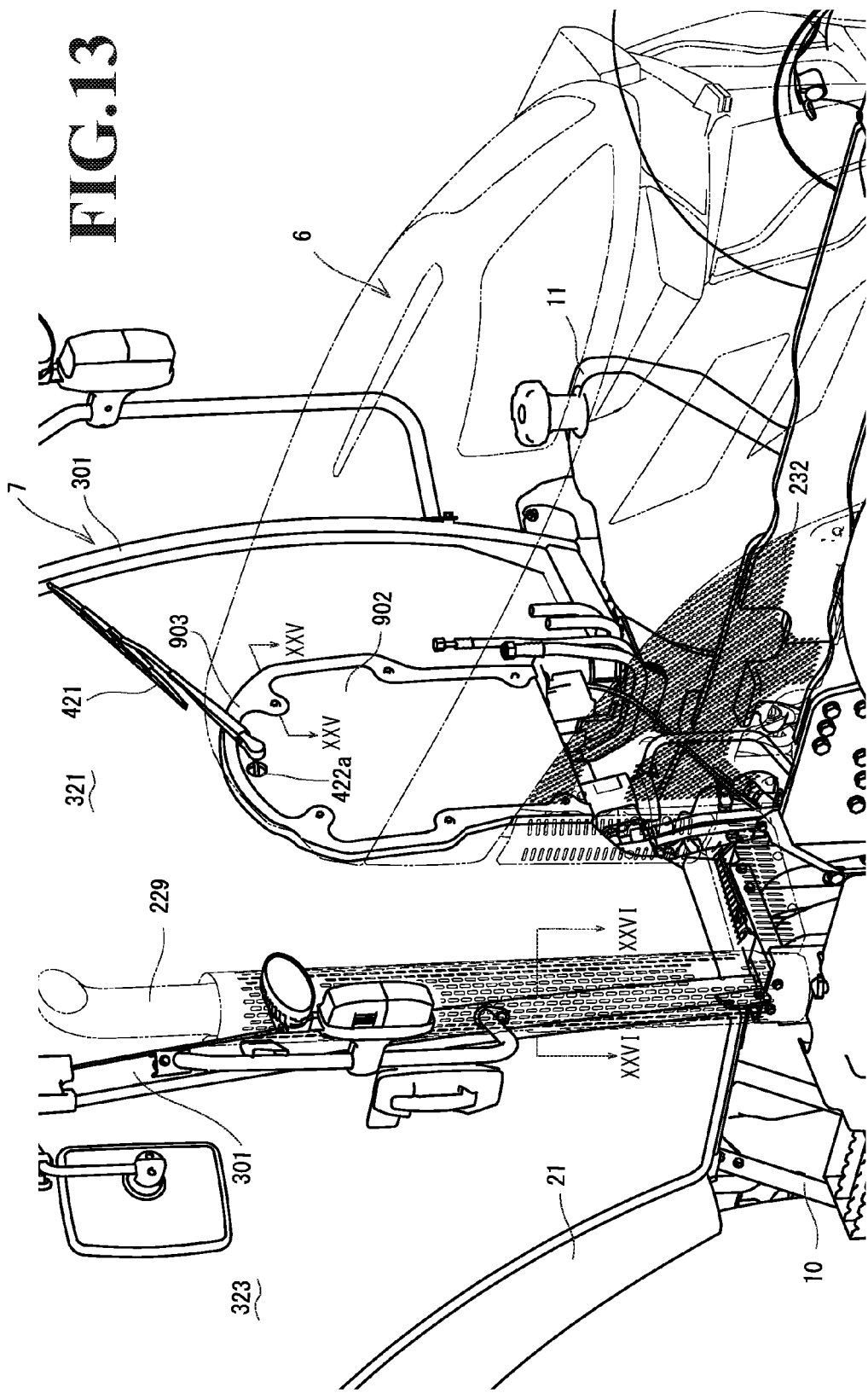
FIG. 13 is a perspective view showing a structure of a front side of a cabin.

A flywheel 26 (refer to FIGS. 4 to 6, 10, and 11) is coupled to an output shaft (a piston rod) of the engine 5, the output shaft protruding rearward from a rear side surface of the engine 5. A main driving shaft 27 and a main transmission input shaft 28 are coupled via a power transmission shaft 29 having universal shaft joints in both ends, the main driving shaft 27 protruding outward from the flywheel 26, and the main transmission input shaft 28 protruding forward from a front surface side of the transmission case 17 (refer to FIGS. 4 to 6). As shown in FIG. 13, in an inner portion of the transmission case 17, there are arranged a hydraulic continuously variable transmission 500, a forward and backward movement switching mechanism 501, travel transmission gear mechanisms 502, 503, and 504, and a different gear mechanism 506 for the rear wheels. The rotary power of the engine 5 is transmitted to the main transmission input shaft 28 of the transmission case 17 via the main driving shaft 27 and the power transmission shaft 29, and is changed by the hydraulic continuously variable transmission 500 and the travel transmission gear mechanism, and the transmission power is transmitted to the right and left rear wheels 4 via the differential gear mechanism 506 for the rear wheels.

A front wheel transmission shaft 508 is coupled via a drive shaft 31 for the front wheels to a front wheel output shaft 30 which protrudes forward out of a lower portion in a front surface of the transmission case 17, the front wheel transmission shaft 508 protruding rearward out of the front axle case 13 which has a differential gear mechanism 507 for the front wheels built-in. The transmission power generated by a hydraulic continuously variable transmission 500 and a travel transmission gear mechanism (a two-wheel/four-wheel drive switching mechanism 504) within the transmission case 17 is structured such as to be transmitted to the right and left front wheels 3 via the differential gear mechanism 507 for the front wheels within the front axle case 13 from the front wheel output shaft 30, the front wheel drive shaft 31, and the front wheel transmission shaft 508.

Next, a description will be given of a structure of an inner portion of the cabin 7 with reference to FIGS. 3, 7 and 8. A steering column 32 is arranged in a front direction of the control seat 8 within the cabin 7. The steering column 32 is provided in a rising manner in a back surface side of a dash board 33 which is arranged in a front surface side in the inner portion of the cabin 7. A control steering wheel 9 formed into an approximately round shape in a plan view is attached to an upper end side of a steering wheel shaft which protrudes upward out of an upper surface of the steering column 32.

Figure 14:
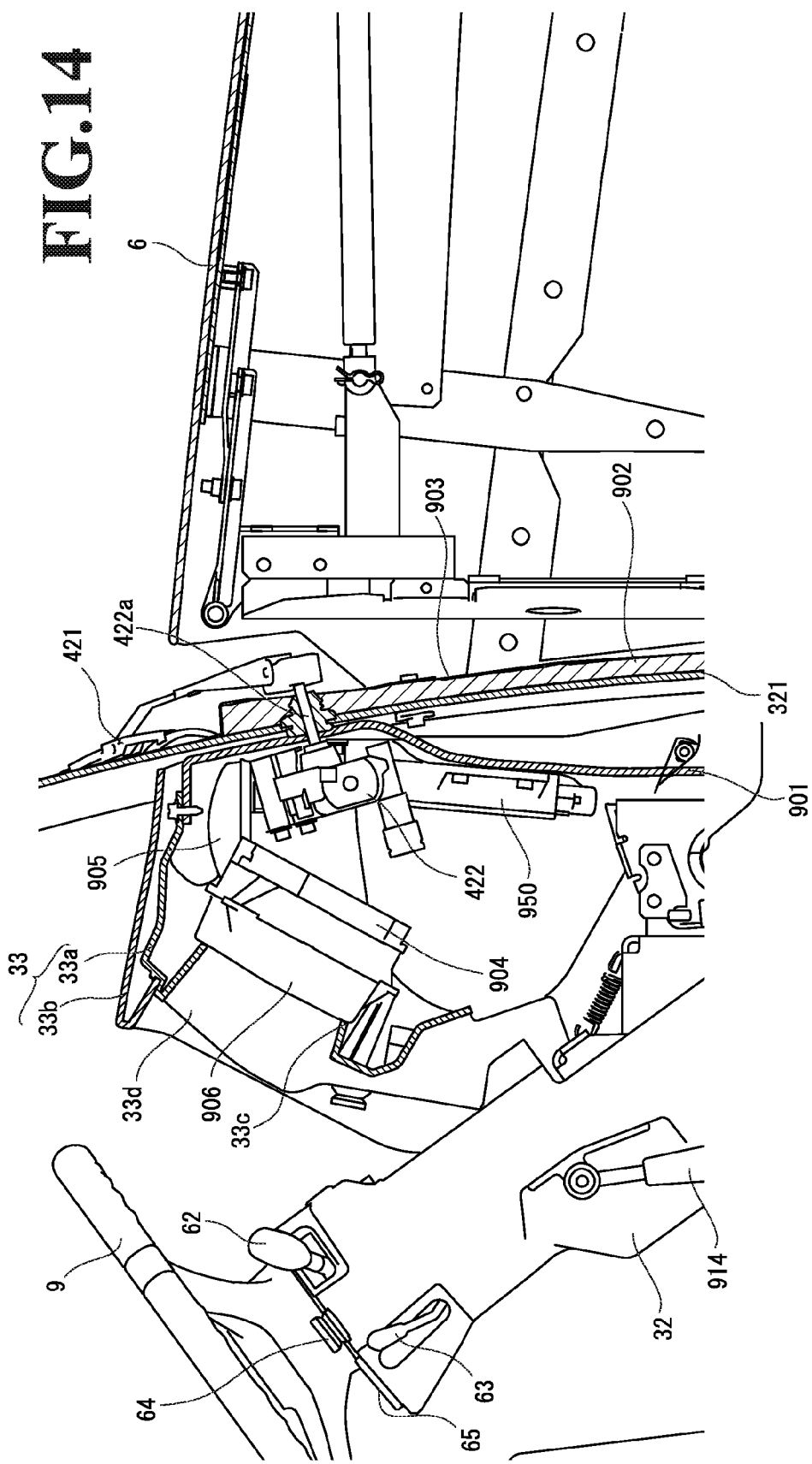
FIG. 14 is a cross sectional view showing a structure of an internal portion of a dash board.
Figure 15:
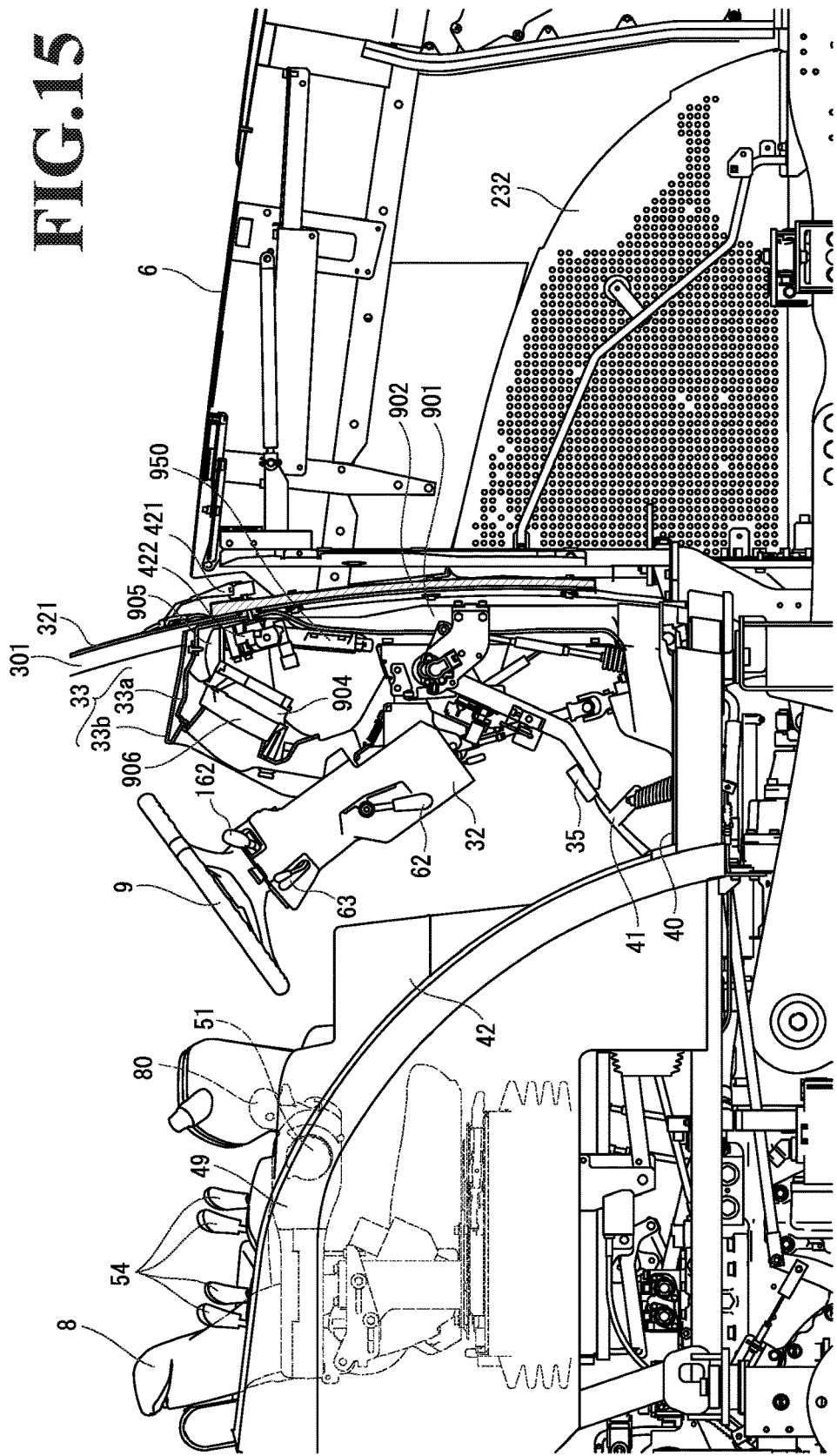
FIG. 15 is an enlarged cross sectional view showing the structure of the internal portion of the dash board.
Figure 16:
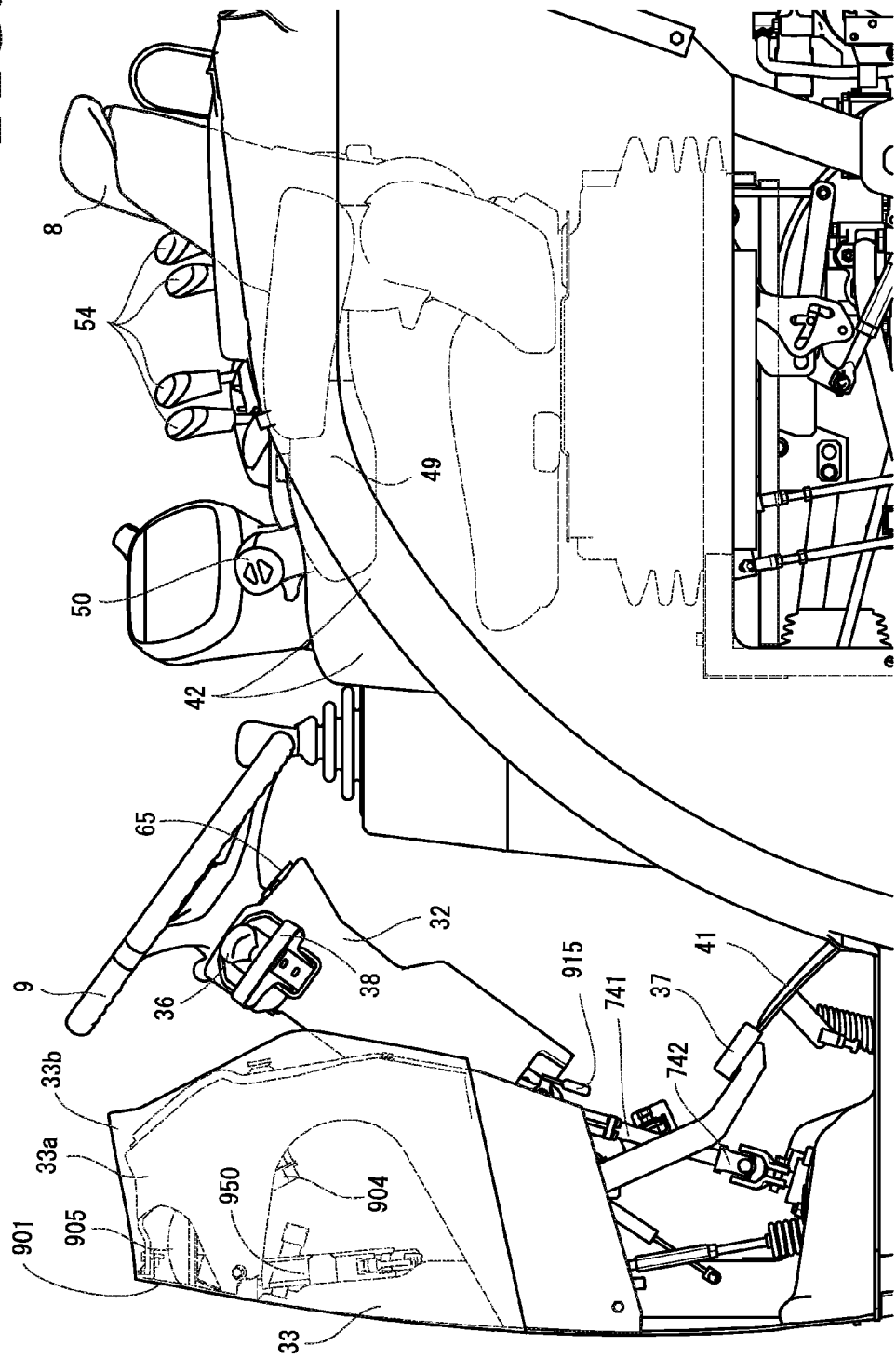
FIG. 16 is a left side elevational view showing a structure of an internal portion of the cabin.
Figure 17:
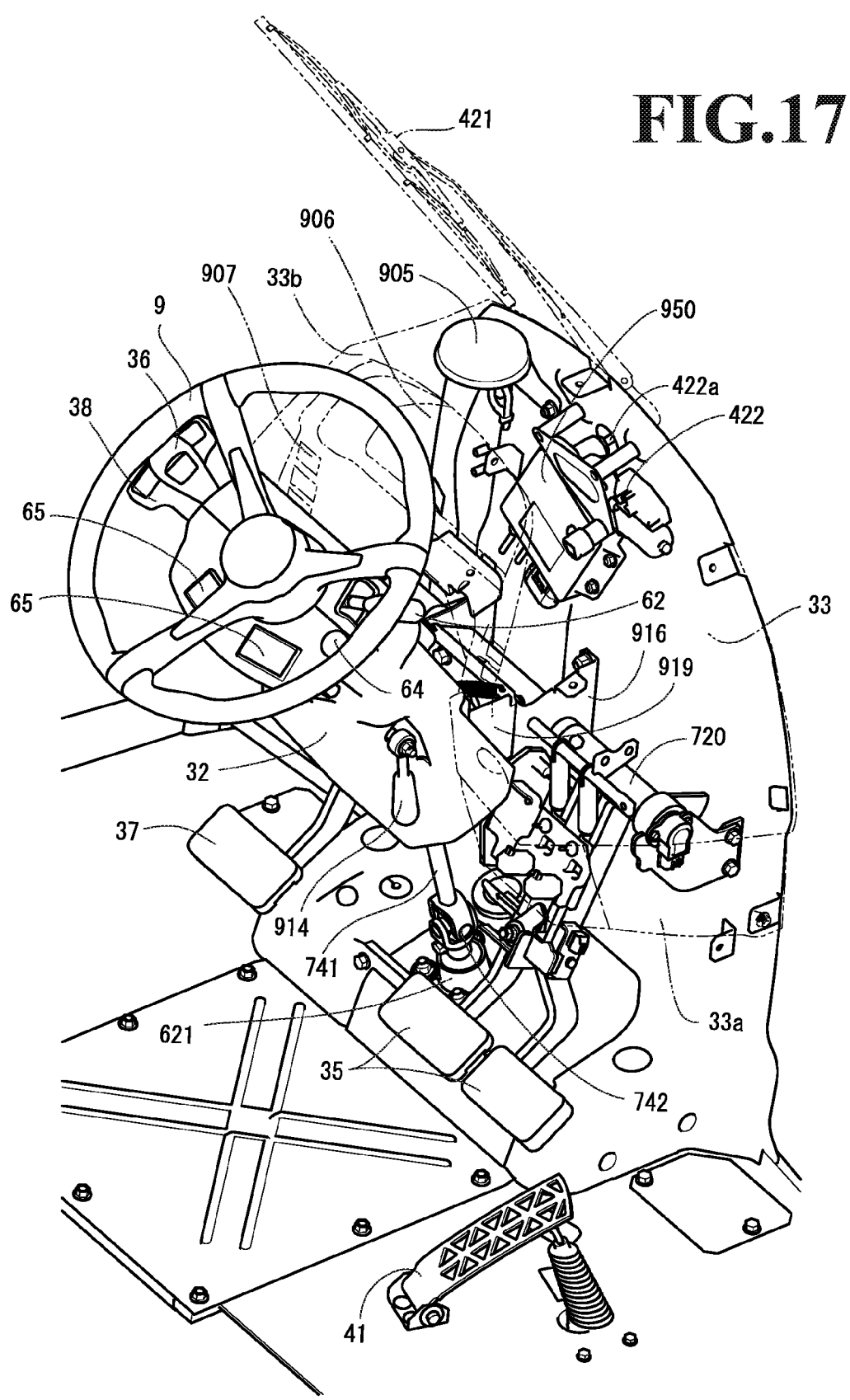
FIG. 17 is a perspective view showing the structure of the internal portion of the dash board.
Figure 18:
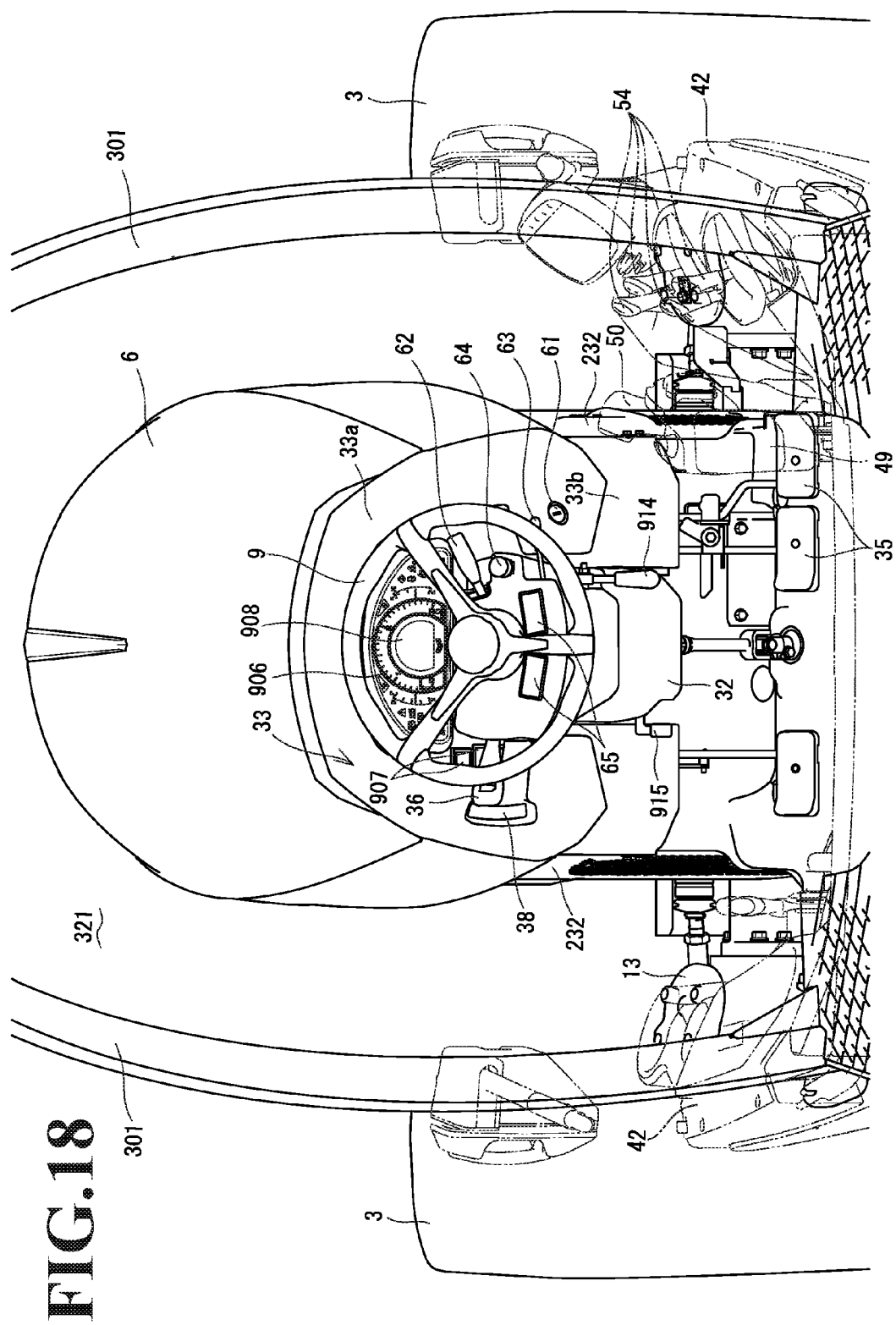
FIG. 18 is a view in the case of viewing a forward direction from a control seat.
Figure 19:
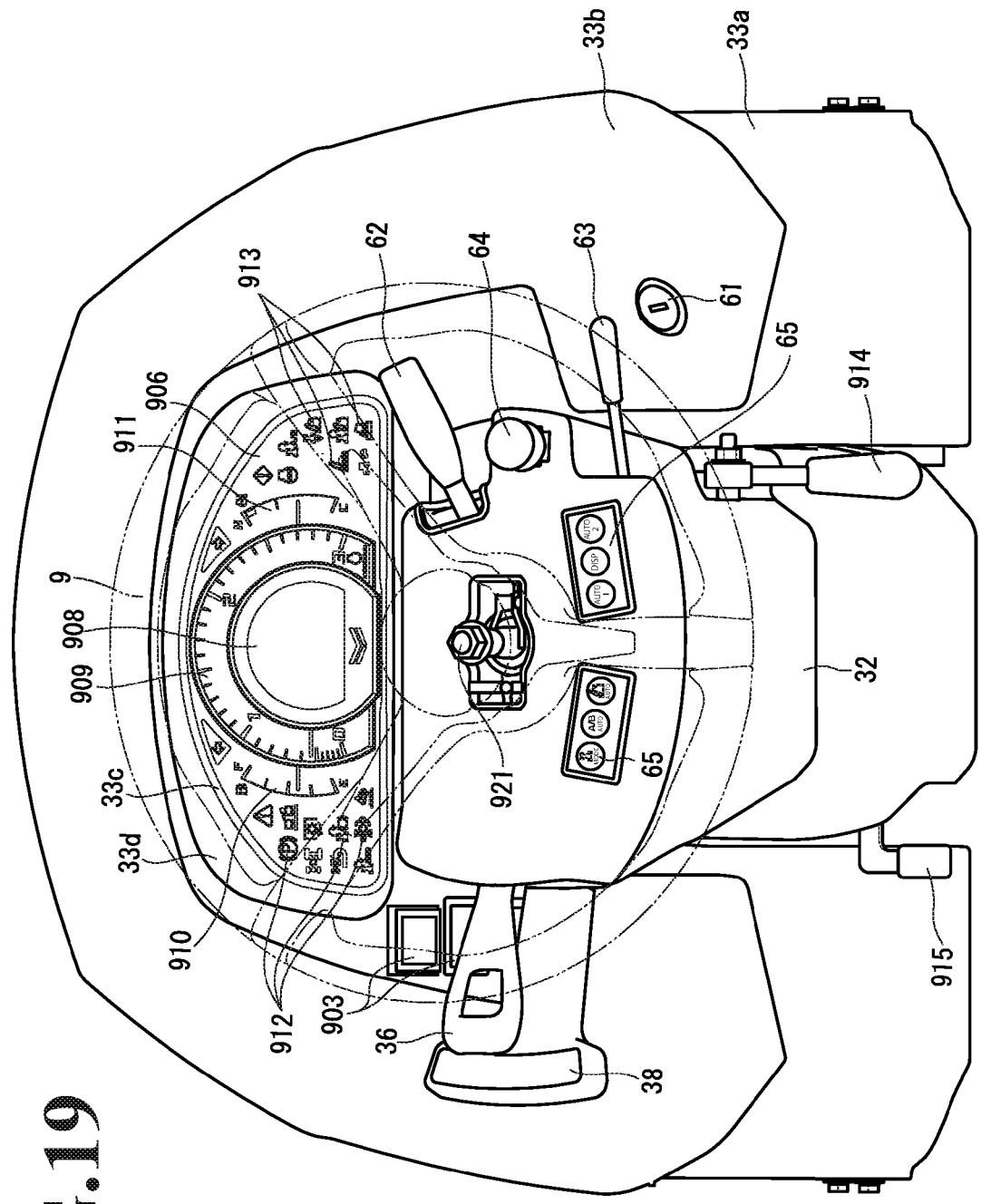
FIG. 19 is a front elevational view of a meter panel as seen from the control seat.

A pair of right and left brake pedals 35 for braking the travel machine body 2 are arranged in a downward side in a right side of the steering column 32. A forward and backward movement switching lever 36 (a reverser lever) is arranged in an upward side in a left side of the steering column 32, the forward and backward movement switching lever 36 being provided for operating to switch a moving direction of the travel machine body 2 to a forward movement and a backward movement. A clutch pedal 37 is arranged in a downward side in a left side of the steering column 32, the clutch pedal 37 being provided for operating to shut off an output of the hydraulic continuously variable transmission 500 (a forward movement low-speed hydraulic clutch 537, a forward movement high-speed hydraulic clutch 539, and a backward movement hydraulic clutch 541). A master control electromagnetic valve 635 is turned on by a stepping operation of the clutch pedal 37, and the forward movement output or the backward movement output of the hydraulic continuously variable transmission 500 is disconnected (refer to FIG. 14).

An erroneous operation prevention body 38 (a reverser guard) extending along the forward and backward movement switching lever 36 is arranged below the forward and backward movement switching lever 36 in the left side of the steering column 32. The operator is prevented from carelessly coming into contact with the forward and backward movement switching lever 36 when the operator gets on and off the tractor 1, by protruding the erroneous operation prevention body 38 corresponding to a contact prevention tool outward more than the forward and backward movement switching lever 36. An operation indicator panel 39 having a liquid crystal panel built-in is provided in an upper portion side on a back surface of the dash board 33.

An accelerator pedal 41 controlling a rotational speed of the engine 5 or a vehicle speed is arranged in a right side of the steering column 32 in a floor panel 40 in a front direction of the control seat 8 within the cabin 7. An approximately whole of an upper surface of the floor panel 40 is formed into a flat surface. Right and left side columns 42 are arranged in both right and left sides while having the control seat 8 therebetween. Between the control seat 8 and the left side column 42, there are arranged a parking brake lever 43 which maintains the right and left rear wheels 4 in a braked state, an ultra-low speed lever 44 (a creep work lever) which widely lowers the forward movement traveling speed (the vehicle speed) of the tractor 1 forcibly, a sub transmission lever 45 which switches an output range of a travel sub transmission gear mechanism 503 within the transmission case 17, and a PTO shift lever 46 which operates to switch a driving speed of the PTO shaft 25. A differential lock pedal 47 for turning on and off a differential drive of the right and left rear wheels 4 is arranged below the control seat 8. An inverse rotation PTO lever 48 executing an operation for inversely driving the PTO shaft 25 is arranged in a left side at the back of the control seat 8 (refer to FIG. 10).

An arm rest 49 for putting an arm or an elbow of the operator seating on the control seat 8 is provided between the control seat 8 and the right side column 42. The arm rest 49 is provided with a main transmission lever 50 which accelerates and decelerates the traveling speed of the tractor 1, and a dial-type work portion position dial 51 (an elevation dial) which manually changes and adjusts a height position of the ground working machine such as the rotary tiller. The arm rest 49 is structured such as to be jumped up and rotatable in a plurality of stages around a lower portion in a rear end.

In the right side column 42, there are arranged a throttle lever 52 which sets and retains the rotational speed of the engine 5, a PTO clutch switch 53 which operates to connect and disconnect the power transmission to the working machine such as the rotary tiller from the PTO shaft 25, and a plurality of hydraulic operation levers 54 (SCV levers) for operating to switch a hydraulic external extraction valve 430 (refer to FIG. 14) which is arranged in an upper surface side of the transmission case 17, in this order from a front side. Here, the hydraulic external extraction valve 430 is provided for feeding and controlling an operating oil to a hydraulic device of the working machine such as the front loader which is later attached to the tractor 1. In the embodiment, four hydraulic operation levers 54 are arranged in conformity to the number (four) of the hydraulic external extraction valves.

Figure 4:
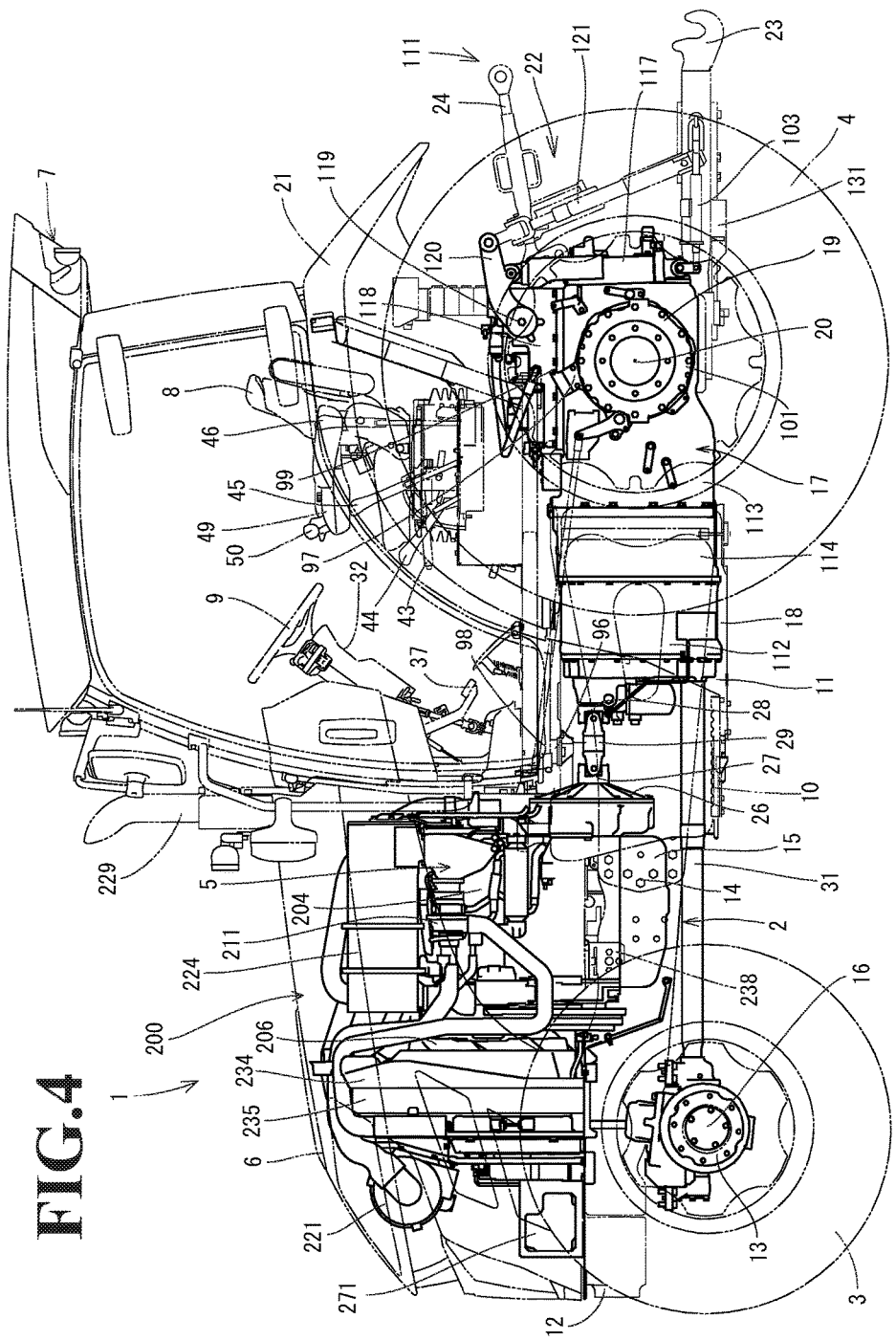
FIG. 4 is an explanatory view of a left side surface of a travel machine body.
Figure 5:
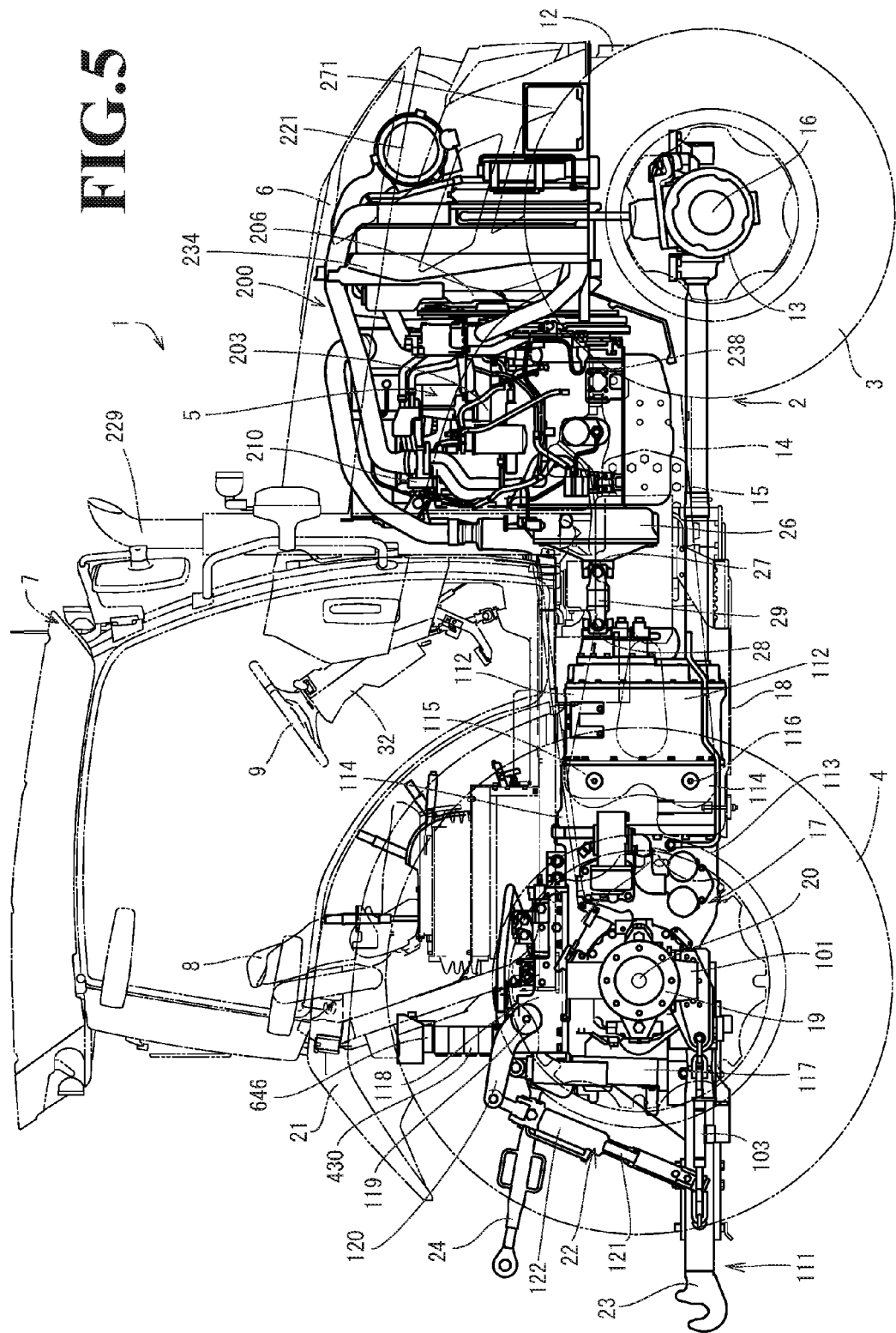
FIG. 5 is an explanatory view of a right side surface of the travel machine body.
Figure 6:
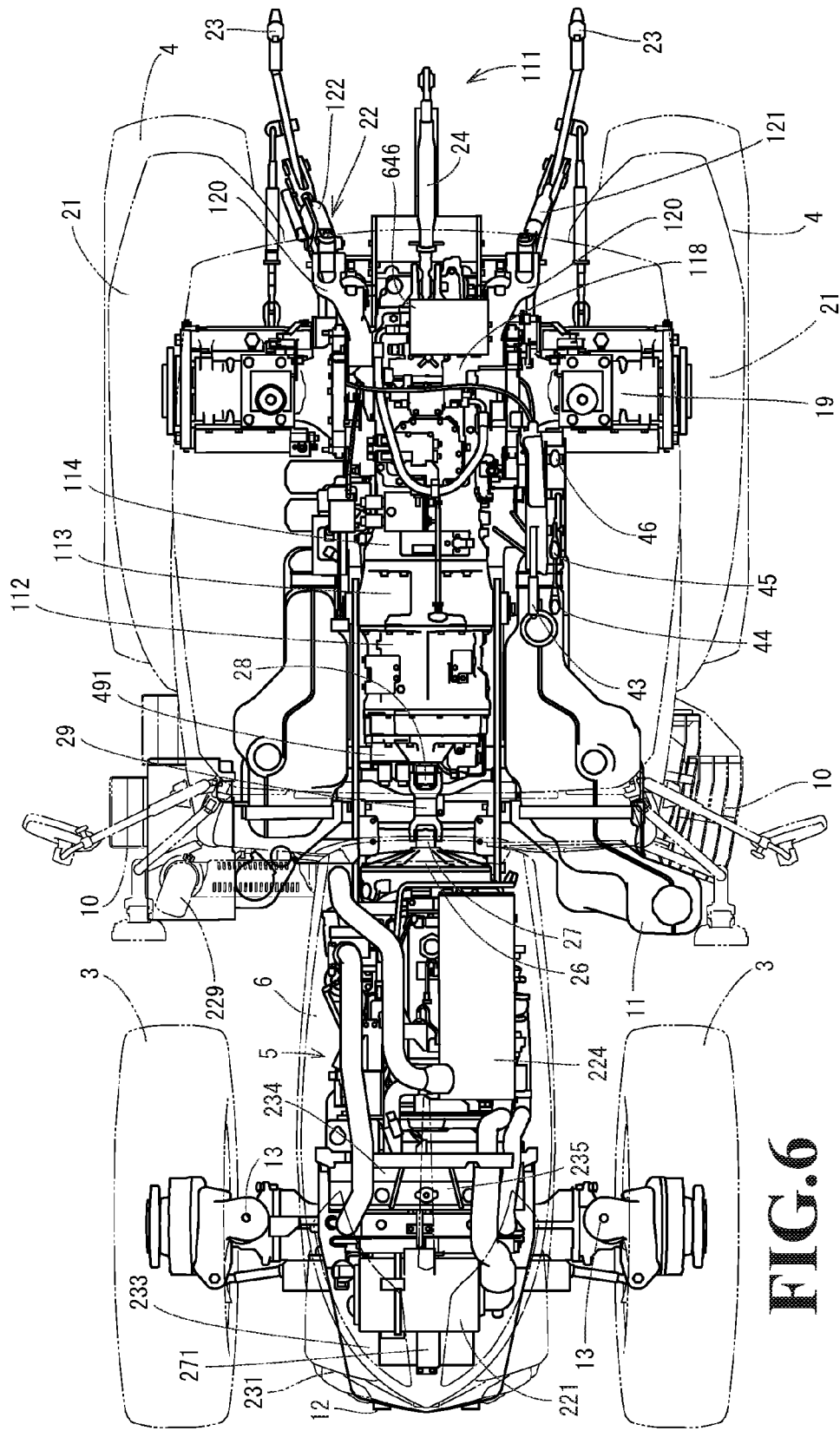
FIG. 6 is a plan view of the travel machine body.

Further, as shown in FIGS. 9 to 12, there are provided right and left front portion support tables 96 which support a front side of the cabin 7, and right and left rear portion support tables 97 which support a rear portion of the cabin 7. The front portion support tables 96 are fastened by bolts to a longitudinally intermediate portion in the external side surfaces of the right and left machine body frames 15, and a bottom portion in the front side of the cabin 7 is supported in a vibration proofing manner to upper surface sides of the front portion support tables 96 via a vibration proofing rubber body 98. Further, the rear portion support tables 97 are fastened by bolts to an intermediate portion of a lateral width in the upper surfaces of the right and left rear axle cases 19 which are extended horizontally in a lateral direction, and a bottom portion in the rear side of the cabin 7 is supported in a vibration proofing manner to the upper surface sides of the rear portion support tables 97 via a vibration proofing rubber body 99. More specifically, the diesel engine 5 and the cabin 7 are supported in a vibration proofing manner to the travel machine body 2 (the engine frame 14, the machine body frame 15, and the rear axle case 19 which are integrally coupled) via a plurality of vibration proofing rubber bodies. Further, as shown in FIGS. 4 and 5, the rear portion support tables 97 are arranged in the upper surface side of the rear axle case 19, a swing prevention bracket 101 is arranged in the lower surface side of the rear axle case 19, and the rear portion support table 97 and the swing prevention bracket 101 are fastened by bolts. Further, both end portions of a swing prevention rod body 103 with a turn buckle which is adjustable in a telescopic motion are coupled to an intermediate portion of the lower link 23 extended in a longitudinal direction and the swing prevention bracket 101. As a result, the swing motion of the lower link 23 in the lateral direction is prevented.

Next, a description will be given of the diesel engine 5 below the hood 6 and an engine room structure with reference to FIGS. 4 to 8. The diesel engine 5 is structured such that a cylinder head is mounted onto a cylinder block which has an engine output shaft and a piston built-in, and an intake air manifold 203 and an EGR device 210 are arranged in a right side surface of the diesel engine 5 (the cylinder head), the intake air manifold 203 being connected to an air cleaner 221 via a turbo supercharger 211, and the EGR device 210 recirculating a part of exhaust gas from an exhaust gas manifold 204. The diesel engine 5 is structured such that a part of the exhaust gas discharged to the exhaust gas manifold 204 flows back to the intake air manifold 203, whereby the highest combustion temperature at the high load operation is lowered, and a discharge amount of NOx (nitrogen oxide) from the diesel engine 5 is reduced. Meanwhile, the exhaust gas manifold 204 connected to a tail pipe 229, and the turbo supercharger 211 are arranged in a left side surface of the diesel engine 5 (the cylinder head). More specifically, the intake air manifold 203 and the exhaust gas manifold 204 are arranged in a sorting manner in the right and left side surfaces along the engine output shaft in the engine 5. A cooling fan 206 is arranged in a front surface side of the diesel engine 5 (the cylinder block).

In addition, as shown in FIGS. 4 to 8, the diesel engine 5 is provided with a continuous regeneration type exhaust gas purification device 224 (DPF) which is arranged in the upper surface side of the diesel engine 5 (above the exhaust gas manifold 204), and connects the tail pipe 229 to the exhaust gas side of the exhaust gas purification device 224. Particulate matter (PM) in the exhaust gas discharged out of the machine via the tail pipe 229 from the engine 5 is removed by the exhaust gas purification device 224, and carbon oxide (CO) and hydro carbon (HC) in the exhaust gas are reduced.

Figure 2:
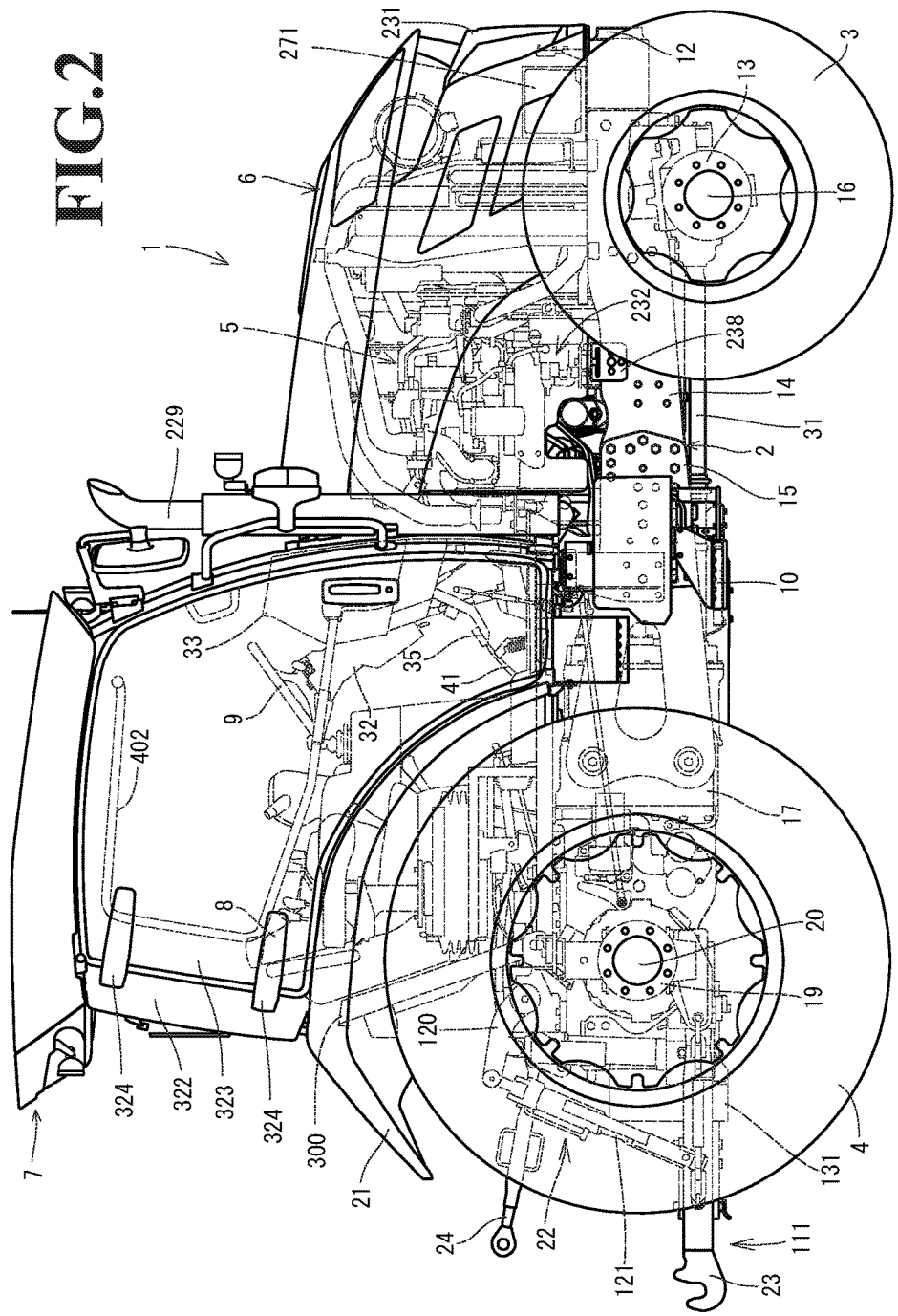
FIG. 2 is a right side elevational view of the tractor.
Figure 3:
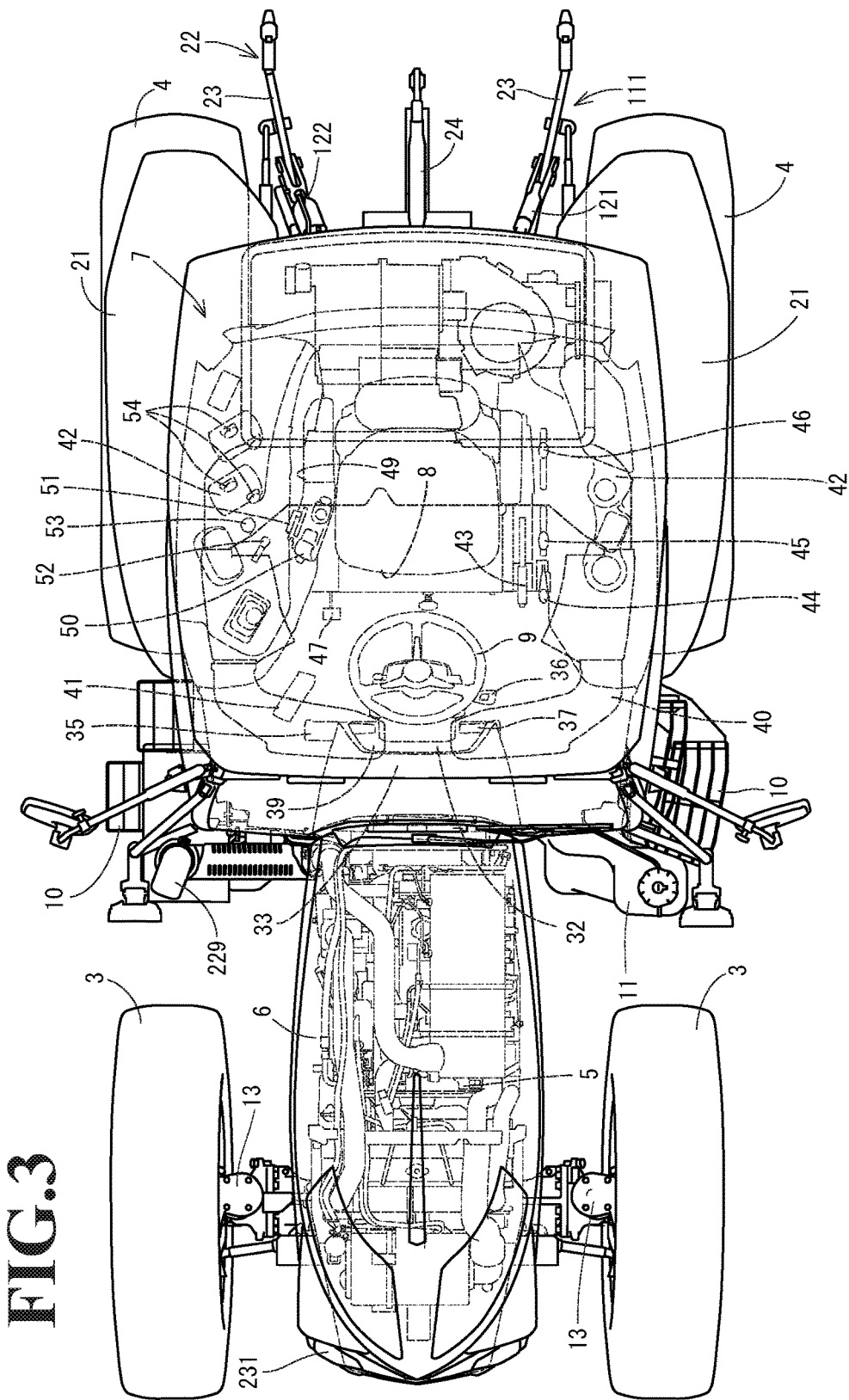
FIG. 3 is a plan view of the tractor.

Further, as shown in FIGS. 1 to 3, the hood 6 has a front grill 231 in a lower side of its front portion, and covers an upper surface side and a front surface side of the engine room 200. A side portion engine cover 232 formed by a porous plate is arranged in right and left lower sides of the hood 6, and covers the right and left lateral sides of the engine room 200. More specifically, the front side, the upper side, and the right and left sides of the diesel engine 5 are covered with the hood 6 and the engine cover 232.

Further, as shown in FIGS. 4 to 8, a radiator 235 having a fan shroud 234 attached to a back surface side thereof is provided in a rising manner on an engine frame 14 so as to be positioned in a front surface side of the engine 5. The fan shroud 234 surrounds an outer peripheral side of a cooling fan 206 and communicates the radiator 235 with the cooling fan 206. An air cleaner 221 is arranged at a position above a front surface of the radiator 235. An oil cooler and a fuel cooler are installed in the front surface side of the radiator 235 in addition to the inter cooler mentioned above. Further, an engine control unit (an engine ECU) 271 is arranged at a front position of a heat exchanger such as the radiator 235. The engine ECU 271 receives a sensor signal from each of the sensors in the engine 5, and controls driving of the engine 5. The engine control unit 271 is provided in a rising manner in a frame bottom plate 233 so as to make a longitudinal direction of the engine control unit 271 be along a longitudinal direction of the travel machine body 2 (a longitudinal direction of the engine frame 14).

Meanwhile, as shown in FIGS. 9 to 12, a pair of right and left machine body frames 15 are coupled by a supporting beam frame 236. The supporting beam frame 236 is fastened by bolts to each of the right and left machine body frames 15, is installed to front end portions of the right and left machine body frames 15 (a rear surface side of the engine 5), and couples a rear portion of the diesel engine 5 to an upper surface of the supporting beam frame 236 via a rear portion engine leg body 237 having a vibration proofing rubber body. As shown in FIGS. 1, 2, 4, 5, 11, and 12, right and left side surfaces in the front portion of the diesel engine 5 are coupled to midstream portions of a pair of right and left engine frames 14 via right and left front portion engine leg bodies 238 having vibration proofing rubber bodies. More specifically, the front side of the diesel engine 5 is supported in a vibration proofing manner to the engine frame 14, and the rear portion of the diesel engine 5 is supported in a vibration proofing manner to the front end sides of a pair of right and left machine body frames 15 via the supporting beam frame 236.

Next, a description will be given of an attaching structure of the transmission case 17, the hydraulic elevating mechanism 22, and the three-point link mechanism 111, with reference to FIGS. 4 to 12. The transmission case 17 is provided with a front portion transmission case 112 having the main transmission input shaft 28, a rear portion transmission case 113 having the rear axle case 19, and an intermediate case 114 coupling a front side of the rear portion transmission case 113 to a rear side of the front portion transmission case 112. The rear end portions of the right and left machine body frames 15 are coupled to the right and left side surfaces of the intermediate case 114 via upper and lower machine body connection shaft bodies 115 and 116 in right and left sides. More specifically, the rear end portions of the right and left machine body frames 15 are coupled to both right and left side surfaces of the intermediate case 114 by two upper machine body connection shaft bodies 115 and two lower machine body connection shaft bodies 116, the machine body frame 15 and the transmission case 17 are integrally connected, and the rear portion of the travel machine body 2 is constructed. Further, the front portion transmission case 112 is structured such as to be protected by arranging the front portion transmission case 112 or the power transmission shaft 29 between the right and left machine body frames 15. The right and left rear axle cases 19 are attached to both the right and left sides of the rear portion transmission case 113 so as to protrude outward. In the embodiment, the intermediate case 114 and the rear portion transmission case 113 are made of cast iron having a high rigidity, and the front portion transmission case 112 is made of aluminum die casting having a light weight and a good workability.

According to the above structure, the transmission case 17 is constructed by being separated into three elements including the front portion transmission case 112, the intermediate case 114, and the rear portion case 113. As a result, three elements including the front portion transmission case 112, the intermediate case 114, and the rear portion transmission case 113 can be assembled after parts such as shafts and gears are previously assembled in each of the cases 112 to 114. Therefore, it is possible to accurately and efficiently assemble the transmission case 17.

Further, the right and left rear axle cases 19 are attached to both right and left sides of the rear portion transmission case 113, and the intermediate case 114 connecting the front portion transmission case 112 and the rear portion transmission case 113 and having the high rigidity structure is coupled to the right and left machine body frames 15 constructing the travel machine body 2. As a result, it is possible to execute a maintenance work or a repairing work of the shaft or the gear in the inner portion of the front portion transmission case 112 which is inward provided with the hydraulic continuously variable transmission (not shown), by detaching only the front portion transmission case 112, for example, in a state in which the intermediate case 114 and the rear portion transmission case 113 are attached to the machine body frame 15. Therefore, it is possible to make the frequency of a disassembling work for detaching a whole of the transmission case 17 from the tractor 1 significantly low, and it is possible to achieve improvement of the workability at the maintaining time or the repairing time.

Further, the intermediate case 114 and the rear portion transmission case 113 are made of the cast iron and the front portion transmission case 112 is made of the aluminum die casting. As a result, the intermediate case 114 and the rear portion transmission case 113 can be constructed as a strength member having a high rigidity, the intermediate case 114 being coupled to the machine body frame 15, and the rear portion transmission case 113 to which the right and left rear axle cases 19 are coupled. In addition, it is possible to save weight of the front portion transmission case 112 which is not the strength member. Therefore, it is possible to achieve weight saving of a whole of the transmission case 17 while sufficiently securing the rigidity of the travel machine body 2.

Meanwhile, as shown in FIGS. 4 to 12, the hydraulic elevating mechanism 22 has right and left hydraulic lift cylinders 117 which are controlled their actuations by an operation of a working portion position dial 51, right and left lift arms 120 which are rotatably pivoted in their base end sides to an upper surface lid body 118 via a lift supporting point shaft 119, the upper surface lid body 118 being provided in an upper surface side of the rear portion transmission case 113 in the transmission case 17 and being openable and closable, and right and left lift rods 121 which couple the right and left lift arms 120 to the right and left lower links 23. A part of the right lift rod 121 is formed by a horizontal cylinder 122 for controlling hydraulic pressure, and a length of the right lift rod 121 is structured such as to be adjustable in a telescopic motion by the horizontal cylinder 122.

Figure 7:
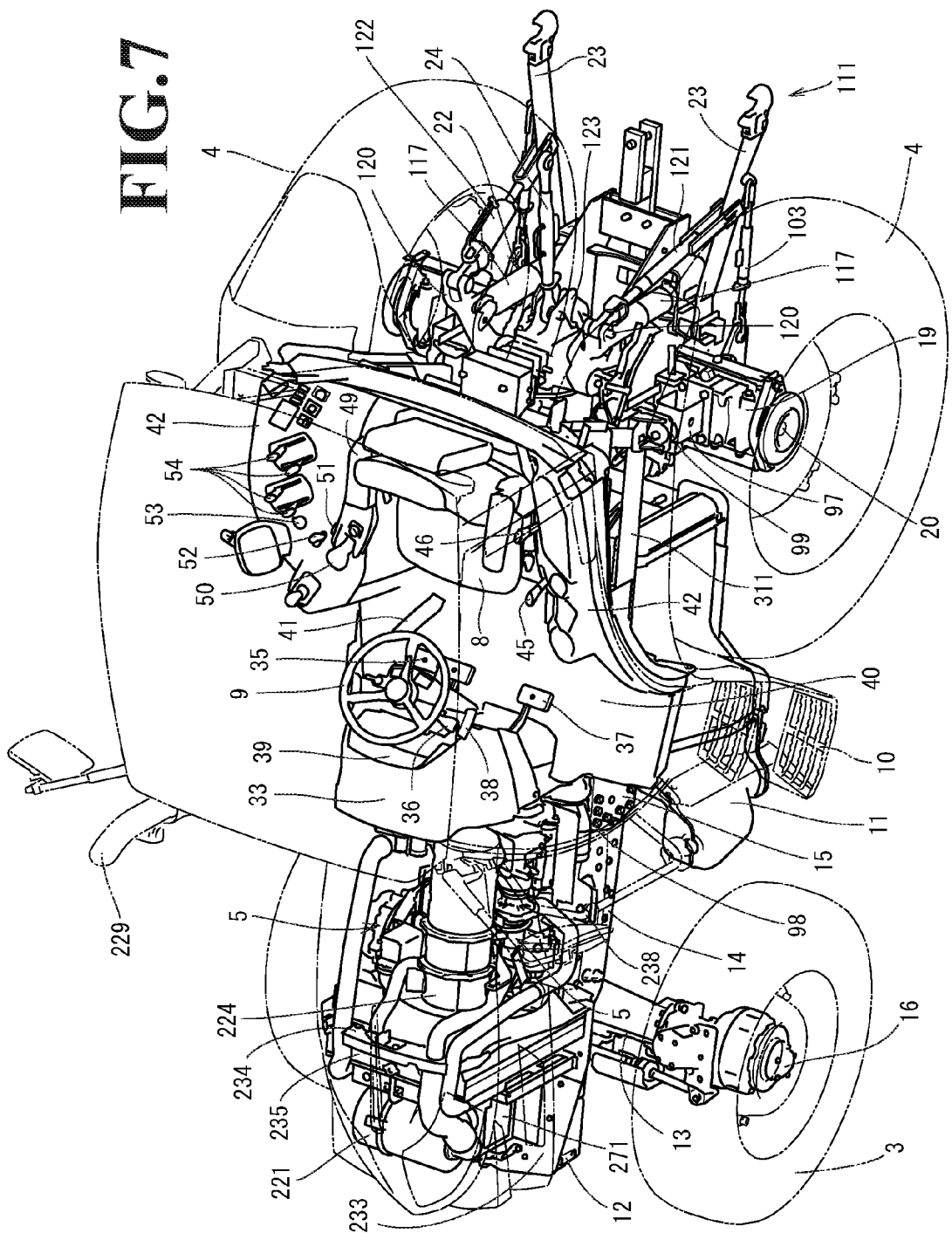
FIG. 7 is a perspective view of the travel machine body as seen from a back direction in a left side.
Figure 8:
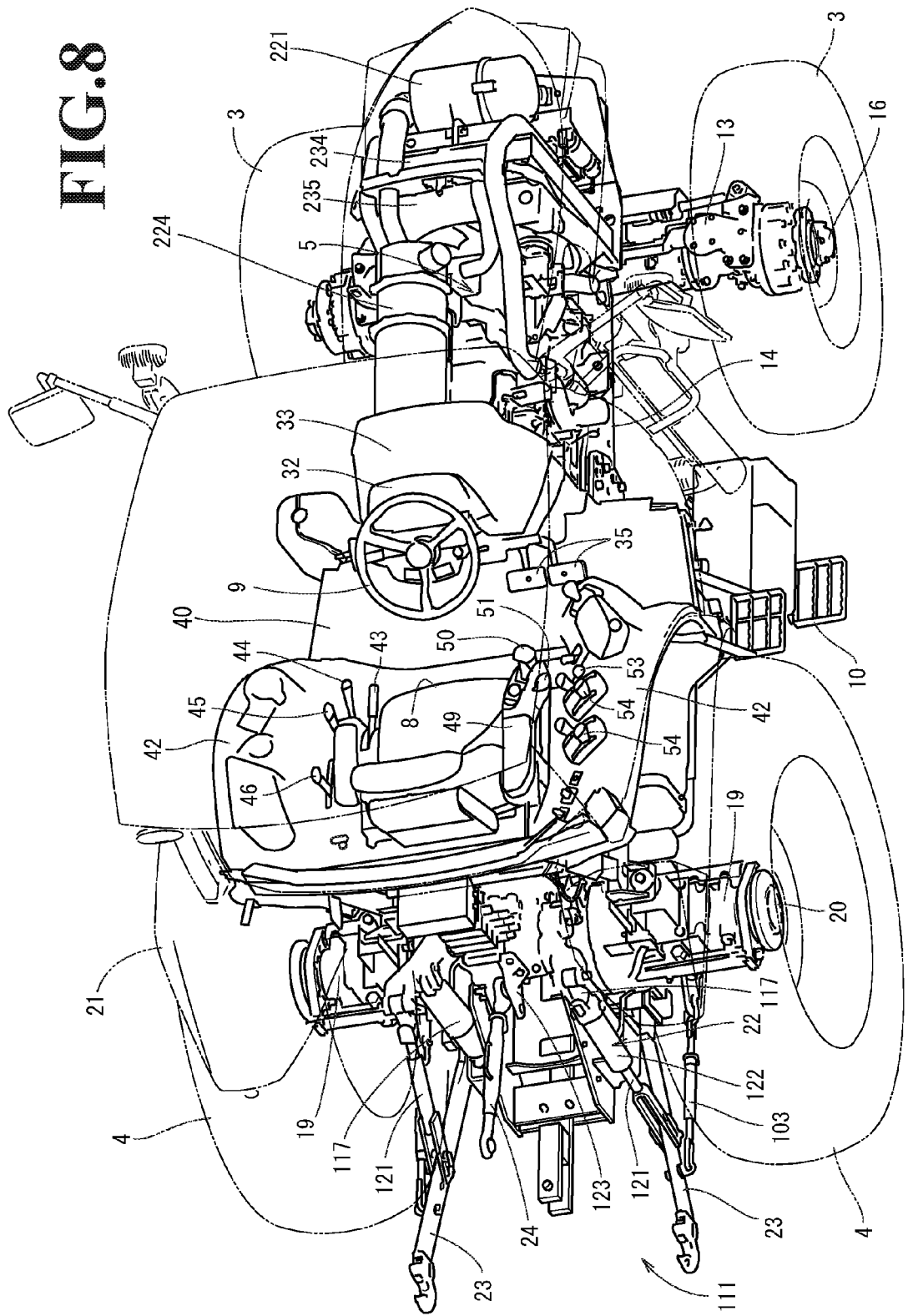
FIG. 8 is a perspective view of the travel machine body as seen from a back direction in a right side.
Figure 9:
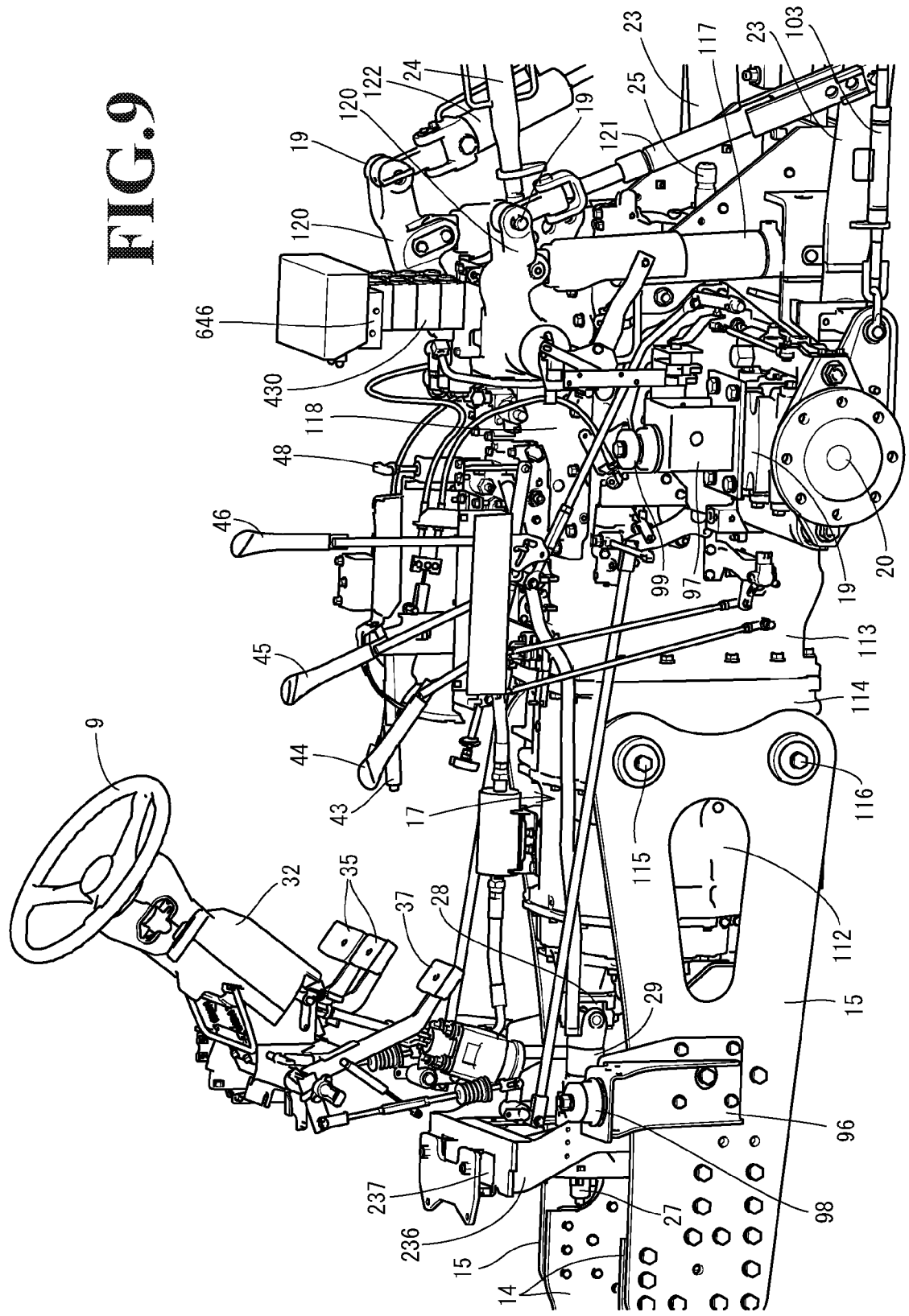
FIG. 9 is an enlarged perspective view of the travel machine body as seen from a lateral direction in a left side.
Figure 10:
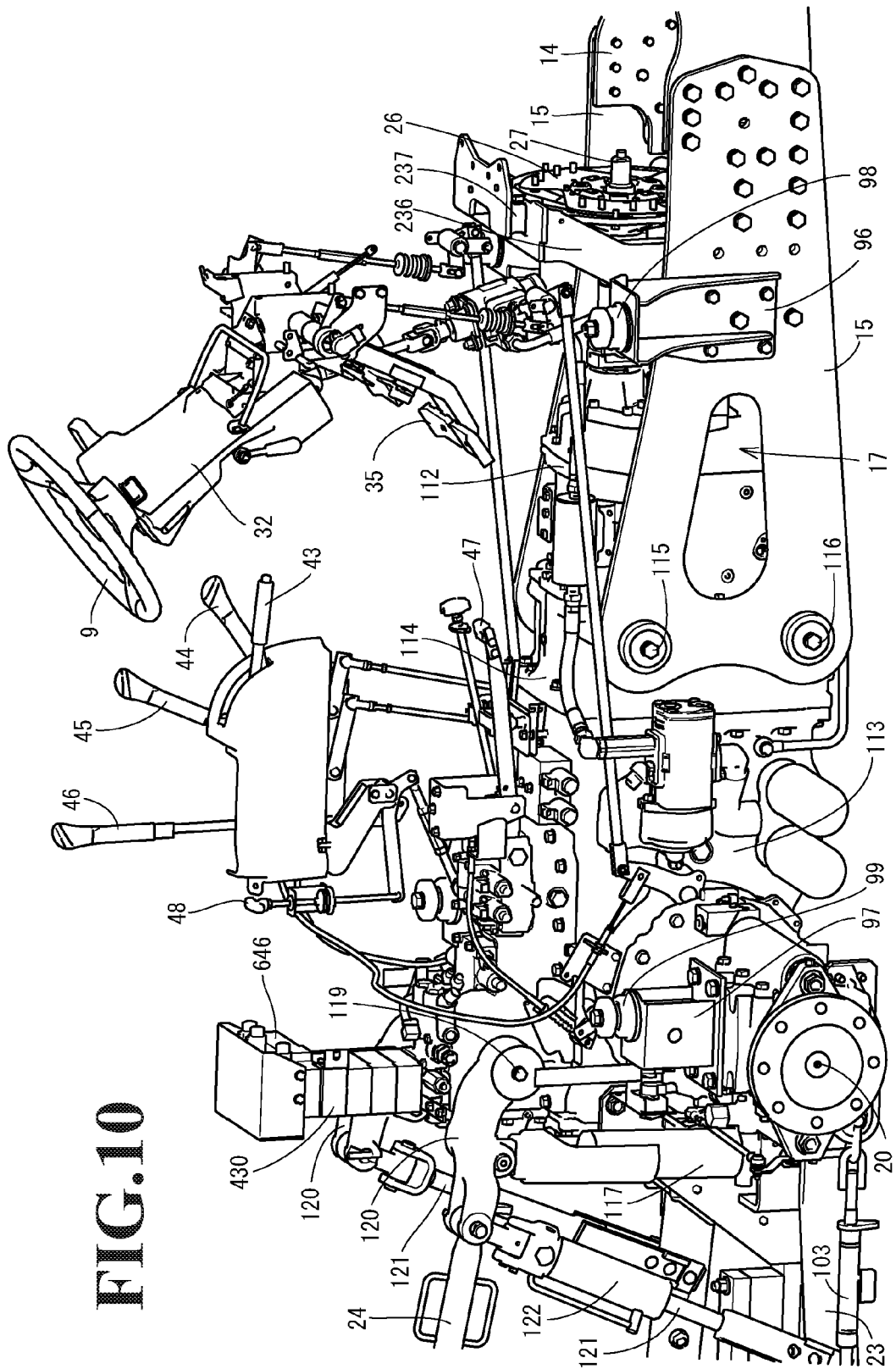
FIG. 10 is an enlarged perspective view of the travel machine body as seen from a lateral direction in a right side.
Figure 11:
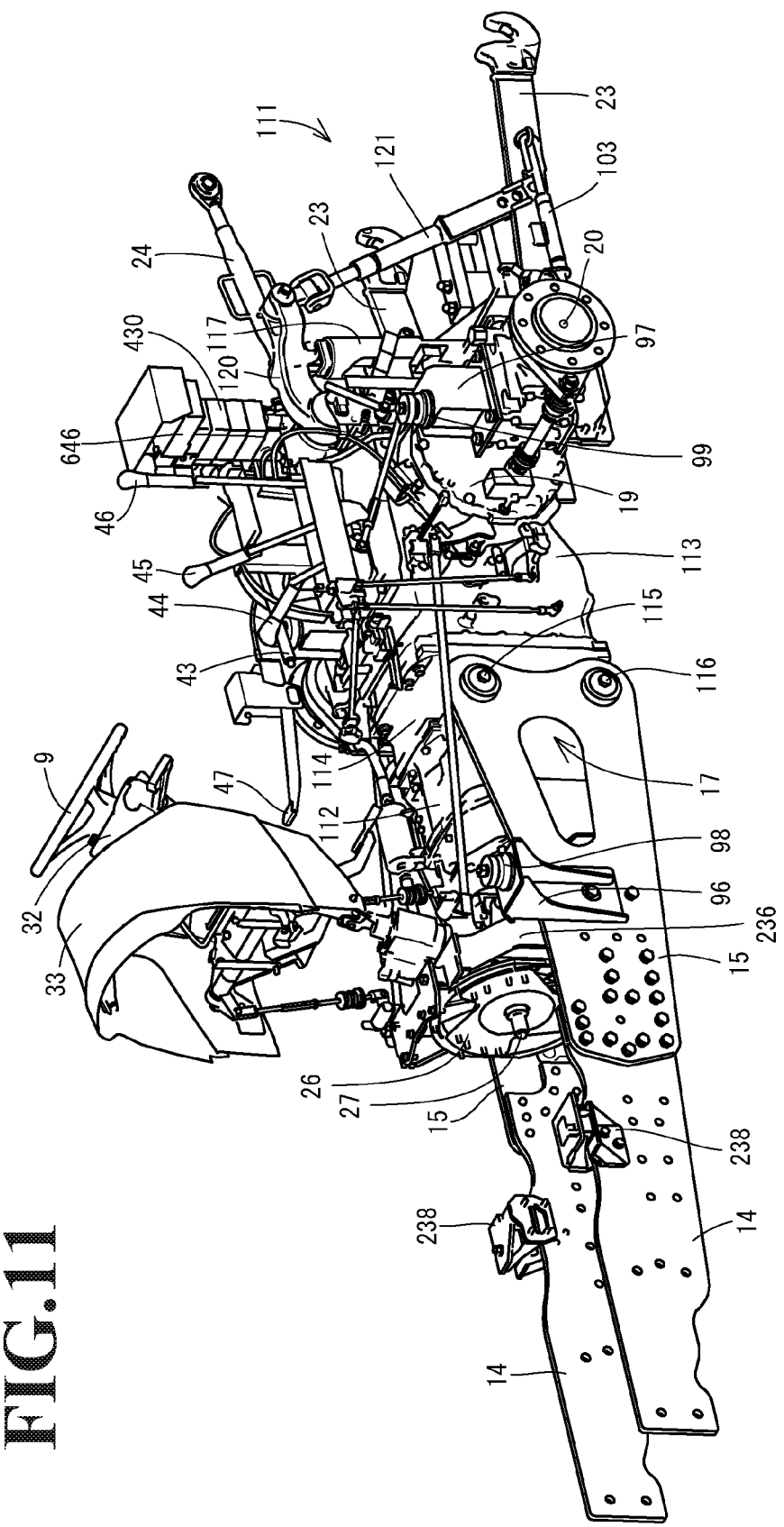
FIG. 11 is a perspective view of the travel machine body as seen from a front direction in a left side.
Figure 12:
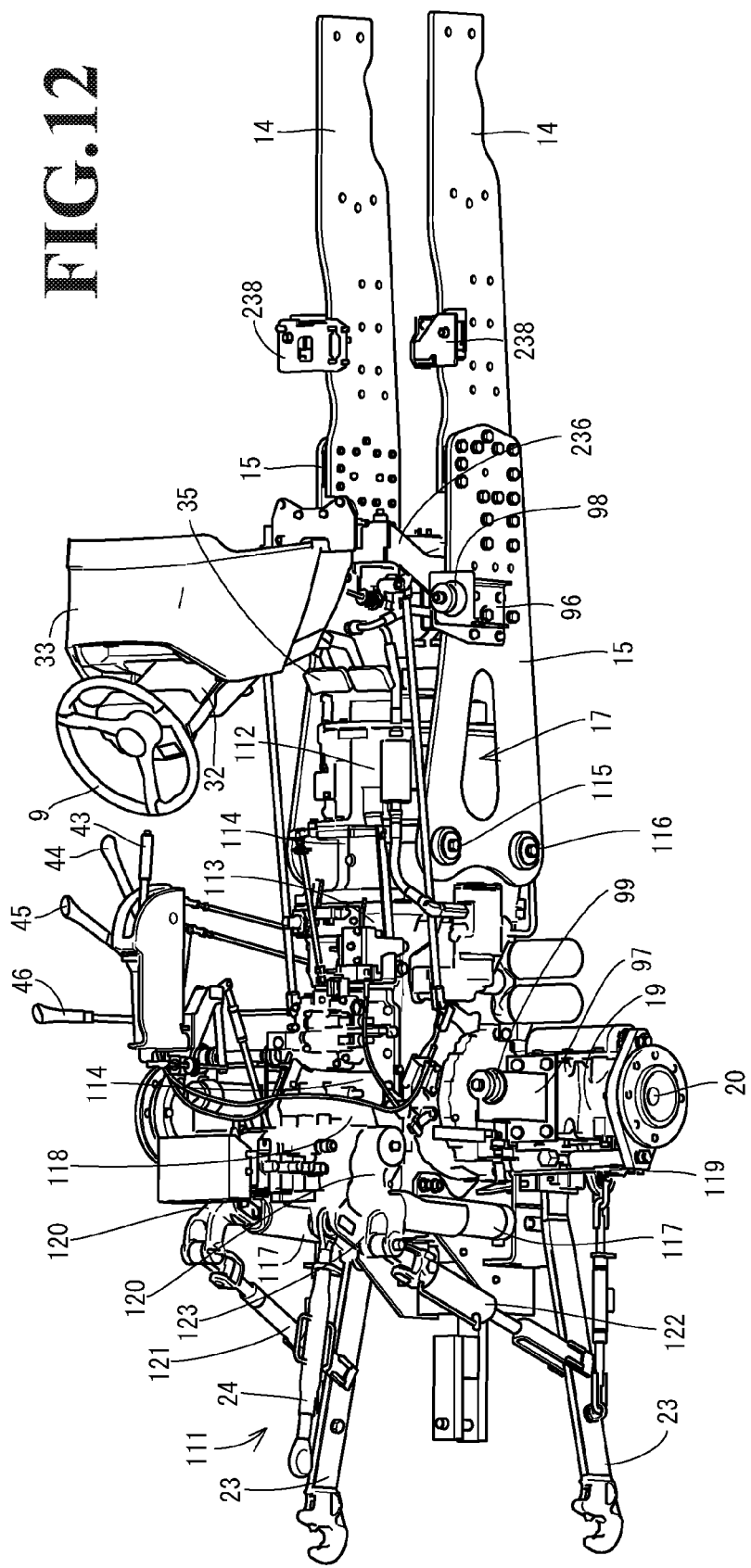
FIG. 12 is a perspective view of the travel machine body as seen from a lateral direction in a right side.

As shown in FIGS. 7, 8, and 10, a top link hinge 123 is firmly fixed to a back surface side of the upper surface lid body 118, and the top link 24 is coupled to the top link hinge 123 via a hinge pin. In the case that the length of the right lift rod 121 is changed by extending or contracting the piston of the horizontal cylinder 122 under a state in which the ground working machine is supported to the top link 24 and the right and left lower links 23, an angle of right and left inclinations of the ground working machine is structured such as to be changed.

Next, a description will be given of a detailed structure of the cabin 7 with reference to FIGS. 1 and 2. The cabin 7 covering the control seat 8 on the travel machine body 2 is provided with a cabin frame 300 which constructs a vehicle frame. The cabin frame 300 is formed into an approximately box frame shape having a pair of right and left front support posts 301 which are positioned in front of the control seat 8, a pair of right and left rear support posts 302 which are positioned at the rear of the control seat 8, a front beam member 303 which couples between upper end portions of the front support posts 301, a rear beam member 304 which couples between upper end portions of the rear support posts 302, and right and left side beam members 305 which couple the upper end portions of the front support post 301 and the rear support post 302 arranged in the front and rear sides. A roof body 306 is detachably mounted onto the upper end side of the cabin frame 301, that is, a rectangular frame which is constructed by the front beam member 303, the rear beam member 304, and the right and left side beam members 305.

End portions in the longitudinal direction of right and left bottom frames 311 extending forward and backward are coupled to lower end sides of the front support posts 301 and the rear support posts 302. The floor panel 40 is provided in a tension manner in upper surface sides of the right and left bottom frames 311, the dash board 33 is provided in a rising manner in the front end side of the floor panel 40, and the control steering wheel 9 is installed to the rear surface side of the dash board 33 via the steering column 32. The brake pedal 35 is arranged in the upper surface side of the front portion in the floor panel 40, and the control seat 8 is attached to the upper surface side of the rear portion in the floor panel 40.

A front window glass 321 is arranged in the front surface side of the cabin frame 300, that is, an area in the front portion of the cabin 7 which is surrounded by the right and left front support posts 301, the front beam member 303, and the front end portion of the floor panel 40. A rear window glass 322 is arranged in the rear surface side of the cabin frame 300, that is, an area in the upper portion of the rear side in the cabin 7 which is surrounded by the right and left rear support posts 302 and the rear beam member 304. Right and left side doors 323 constructed by a transparent glass are arranged in the right and left side surface sides of the cabin frame 300, that is, an area in the side portions of the cabin 7 which is surrounded by the front support post 301 and the rear support post 302 arranged in the front and rear sides. Each of the side doors 323 is attached to the corresponding rear support post 302 via a pair of upper and lower hinges 324 so as to be openable and closable.

As is apparent from the arrangement structure of the front window glass 321, the rear window glass 322, and the right and left side doors 323, each of the support posts 301 and 302 and each of the beam members 303, 304, and 305 are positioned in the side edge portions of the cabin 7 (the cabin frame 300). More specifically, the window can be provided widely in the front and rear surfaces and the right and left side surfaces of the cabin frame 300. In the embodiment, the front window glass 321, the rear window glass 322, and the right and left side doors 323 made of the transparent glass are arranged in the front and rear surfaces and the right and left side surfaces of the cabin frame 300. As a result, the rigidity of the cabin frame 300 can be secured as well as the field of vision of the operator in the front and rear sides and the right and left sides can be widely secured.

As shown in FIGS. 13 to 19, the front side of the dash board 33 is covered with a heat shield plate (an air-cut plate) 901 for shielding heat from the engine 5 below the hood 6. Further, the front window glass 321 is constructed by one glass plate, and the air-cut plate 901 is supported in a contact manner to a back surface of the front window glass 321. Further, a urethane material 902 having both heat shielding property and sound insulating property is provided in a front surface of the front window glass 321. The urethane material 902 and the air-cut plate 901 are positioned in the front and rear sides of the front window glass 321 by fastening a sheet metal frame 903 surrounding an outer periphery of the urethane material 902 to the front window glass 321.

Figure 25:
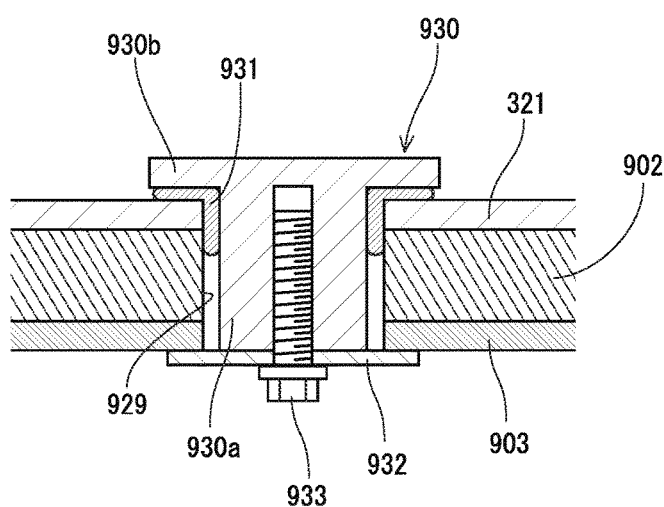
FIG. 25 is a cross sectional view as seen from a line XXV-XXV in FIG. 13.

In this case, a plurality of through holes 929 are formed at a position where the front window glass 321, the urethane material 902, and the sheet metal frame 903 overlap. As shown in FIG. 25, a small-diameter portion 930a of a stepped collar 930 is passed through each of the through holes 929 from the back surface side of the front window glass 321. An elastic material 931 such as rubber is fitted to the small-diameter portion 930a of the stepped collar 930. In a state in which the small-diameter portion 930a of the stepped collar 930 is inserted into the through hole 929, the elastic material 931 interposes between the stepped collar 930 and the front window glass 321. A large-diameter portion 930b of the stepped collar 930 is closely attached to the back surface side of the front window glass 321 via the elastic material 931. A washer 932 is arranged in an end surface close to the sheet metal frame 903 in the small-diameter portion 930a of the stepped collar 930. The washer 932 is detachably fastened to the small-diameter portion 930a of the stepped collar 930 by bolts 933. As a result, the front window glass 321, the urethane material 902, and the sheet metal frame 903 are pinched and fixed by the large-diameter portion 930b of the stepped collar 930 and the washer 932. It goes without saying that a diameter of the large-diameter portion 930b of the stepped collar 930 and a diameter of the washer 932 are larger than a diameter of the through hole 929.

According to the structure mentioned above, it is possible to closely attach the front window glass 321 and the urethane material 902, and it is possible to improve the sound proofing function and the vibration damping function of the front window glass 321, and further of the cabin 7 having the front window glass 321. Further, the urethane material 902 can be replaced easily by detaching the stepped collar 930 and the washer 932, and a replacing work (a maintenance work) of the urethane material 902 is easy. Further, since the stepped collar 930 in a state in which the elastic material 931 is fitted is passed through the position where the front window glass 321, the urethane material 902, and the sheet metal frame 903 overlap, it is possible to contribute to further improvement of the sound proofing function and the vibration damping function of the windshield 321 and further of the cabin 7.

The dash board 33 covers a rear side of the front window glass 321 and is internally equipped with a wiper driving mechanism 422. The wiper driving mechanism 422 is constructed by a drive motor which generates rotary power to the wiper 421 axially supported to the front window glass 321, and a gear mechanism which transmits the rotary power of the drive motor to the wiper 421. The rotation of the drive motor is transmitted to the wiper 421 via the gear mechanism on the basis of the rotation of the drive motor in the wiper driving mechanism 422, and the wiper 421 rotates along a surface of the front window glass 321.

The wiper driving mechanism 422 is coupled and fixed to the air-cut plate 901. More specifically, the wiper driving mechanism 422 is firmly fixed to a rear surface of the air-cut plate 901, and the front window glass 321 is provided in a tension manner in a front surface side of the air-cut plate 901. Further, the drive shaft 422a of the wiper driving mechanism 422 is passed through the front window glass 321. The drive shaft 422a of the wiper driving mechanism 422 pivotally supports the wiper 421, and the wiper 421 rotates by the wiper driving mechanism 422.

Further, the urethane material (the sound insulation material) 902 surrounded by the sheet metal frame 903 is provided in an area facing to the air-cut plate 901 in the front surface of the front window glass 321. Further, the drive shaft 422a of the wiper driving mechanism 422 is passed through the urethane material 902. Since the urethane material 902 is provided in a tension manner in the front surface of the front window glass 321, it is possible to prevent the noise from the engine 5 from being transmitted to the air-cut plate 901 side.

A communication terminal device 950 and a GPS antenna 905 are firmly fixed to a rear surface of the air-cut plate 901 together with the wiper driving mechanism 422. The air-cut plate 901 can be constructed as one unit by attaching the wiper driving mechanism 422, the communication terminal device 950, and the antenna 905 to the air-cut plate 901. As a result, it is possible to simplify an assembling work of each of the parts to the inner side of the dash board 33. The antenna 905 is a GPS antenna which receives a radio wave from the GPS (global positioning system) satellite. Further, since the communication terminal device 950 and the GPS antenna 905 can be arranged within the dash board 33 in a close contact manner, it is easy to electrically connect the communication terminal device 950 and the GPS antenna 905. Further, since the communication terminal device 950 and the GPS antenna 905 are arranged in a place which is invisible from the external side, it is possible to prevent access from the external portion by a third person. For example, it is possible to prevent disconnection of an electric wiring between the communication terminal device 950 and the GPS antenna 905 and steal thereof.

The antenna 905 and the communication terminal device 950 are fixed to a rear surface of the air-cut plate 901, and are arranged within the dash board 33 which is provided in a rising manner so as to bury the steering column 32, the antenna 905 executing communication with the external portion and the communication terminal device 950 being electrically connected to the antenna 905. Further, a meter panel 906 is fixed to the dash board 33, a meter controller 904 electrically connected to the meter panel 906 is integrally constructed with the meter panel 906, and the meter controller 904 is arranged within the dash board 33 so as to face to the communication terminal device 950. The meter controller 904 can be compactly installed within the dash board 33 together with the communication terminal device 950 and the GPS antenna 905, the electric wiring can be formed as a short channel, and it is possible to simplify the wiring work.

The dash board 33 is constructed by an inner board (an inside board) 33a and an outer board (an outside cover) 33b. The inner board 33a is fixed to a back surface of the air-cut plate 901 by coupling an outer peripheral edge of the inner board 33a to an outer peripheral edge of the air-cut plate 901. Further, the dash board 33 is formed by fitting the outer board 33b from an upper side of the inner board 33a so as to cover the upper portion of the inner board 33a. An opening portion 33c is provided in an upper side at the center of the inner board 33a, and the meter panel 906 is fixed to the front surface of the inner board 33a in such a manner that a display surface of the meter panel 906 is accommodated in the opening portion 33c.

Further, since the inner board 33a has a shape obtained by raising an outer peripheral portion of the opening portion 33c, the inner board 33a is set to a state of surrounding an outer side of the display portion in the meter panel 906 by a side wall 33d. As a result, since the display surface of the meter panel 906 can be arranged at a position which is far from the back surface of the dash board 33, it is possible to prevent reflection on the side door 323 of the cabin 7. As a result, there is no reflection on the basis of light generation of the display surface of the meter panel 906, and it is possible to prevent the field of vision of the operator from being disturbed at the traveling time or the working time. A meter ECU (a meter controller) 904 is attached to a back surface of the meter panel 906. More specifically, the meter ECU 904 is provided integrally with the meter panel 906, and is buried in the dash board 33.

The meter panel 906 is arranged in a state in which its panel surface is inclined somewhat upward from a rear side, at a position which is a lower side in front of the control steering wheel 9, in such a manner as to face to the operator seating on the control seat 8. Further, an outer edge of the meter panel 906 is covered with a side wall 33d of the inner board 33a which is upraised toward an outer side from an inner side. In the inner board 33a, a plurality of switch members 907, for example, a parking switch and the like are arranged at a position in an outer periphery of the meter panel 906. Further, a key switch 61 is a rotary type switch which can be rotationally operated by a predetermined key inserted into a key hole, and is attached to a right position of the control steering wheel 9 in the dash board 33.

In the meter panel 906, a liquid crystal panel 908 for carrying out character representation is arranged in its center display area, and an engine speed meter 909 indicating a speed of rotation of the engine 5 with an indicator is provided in an outer periphery of the liquid crystal panel 908. Further, in the meter panel 906, a fuel meter 910 indicating a remaining amount of fuel with an indicator is arranged in a left side of the engine speed meter 909, and a water temperature meter 911 indicating a cooling water temperature of the engine 5 with an indicator is arranged in a right side of the engine speed meter 909.

Further, in the meter panel 906, a plurality of display lamps 912 and 913 constructed by LED are arranged in a display area in right and left outer sides of the engine speed meter 909 (an outer side of the central display area). The display lamp 912 arranged in the left side of the engine speed meter 909 acts, for example, as a warning light or an indication light regarding to a traveling system. Meanwhile, the display lamp 913 arranged in the right side of the engine speed meter 909 acts as a warning light or an indication light relevant to a working system. Further, one of the right and left display lamps 912 and 913 is operated as the warning light for minor failure, and the other is operated as the warning light for major failure. Further, in the case that the display lamp 912 in the left side is operated as the warning light or the indication light regarding to the traveling system, one of the display lamps 912 is allocated to a regeneration lamp indicating a regeneration treatment state of the exhaust gas purification device 224.

The steering column 32 is installed so that a periphery thereof is surrounded by the inner board 33b, and is provided in a rising manner in a state of being buried in the back surface side of the dash board 33. A vertically long steering wheel shaft 921 is axially supported within the steering column 32. An upper end side of the steering wheel shaft 921 protrudes upward from the upper surface of the steering column 32. The control steering wheel 9 approximately formed into a round shape in a plan view is attached to an upper end side of the steering wheel shaft 921. A leading end side of a vertically long steering shaft 740 is coupled to a lower end side of the steering wheel shaft 921 via a universal joint. An operation shaft 742 of a power steering hydraulic mechanism 621 is coupled to a base end side of the steering shaft 740, the power steering hydraulic mechanism 621 being supported to a lower portion side of the board support plate (the air-cut plate) 901 via a universal joint 741.

A tilt lever and a telescopic lever 914 are arranged in a sorting manner in right and left sides of the steering column 32 where the control steering wheel 9 is arranged, the tilt lever 915 and the telescopic lever 914 adjusting a posture of the control steering wheel 9. More specifically, the telescopic lever 914 is axially supported in a lateral direction and rotates in a longitudinal direction, and is provided in the right side surface of the steering column 32. The tilt lever 915 is axially supported in a lateral direction and rotates in a longitudinal direction, and is provided in a lower side of the left side surface of the steering column 32. Further, a telescopic mechanism 917 and a tilt mechanism 918 are provided within the steering column 32, the telescopic mechanism 917 moving the control steering wheel 9 in an axial direction of the steering wheel shaft 921, and the tilt mechanism 918 tilting the control steering wheel 9 together with the steering wheel shaft 921.

A brake pedal support mechanism 916 is arranged in the front side of the steering column 32, the brake pedal support mechanism 916 having a brake pedal shaft 720 which axially supports the right and left brake pedals 35. The brake pedal support mechanism 916 is coupled and supported to a midstream portion of the air-cut plate 901. Further, the tilt mechanism 915 is arranged in a lower side of the steering column 32, and is pivotally attached to a retaining bracket 919 which is coupled to the brake pedal support mechanism 916. More specifically, the tilt mechanism 918 is rotatably pivoted to the retaining bracket 919 which is firmly fixed to the air-cut plate 901 via the brake pedal support mechanism 916. Further, a telescopic mechanism 917 is provided in an upper side of the tilt mechanism 918 within the steering column 32, the telescopic mechanism 917 being stretchable on the basis of a double-shaft structure. Further, the steering column 32 is coupled to a leading end side of the telescopic mechanism 917.

The operator can release the fixation by the telescopic mechanism 917 by rotating the telescopic lever 914 to a near side, and can adjust the height position of the control steering wheel 9 by making the control steering wheel 9 movable along an axial direction of the steering wheel shaft 921, as shown in FIG. 20. At this time, since the steering column 32 is fixed to the leading end side of the telescopic mechanism 915, the steering column 32 can be moved up and down together with the operation steering wheel 9.

Figure 21:
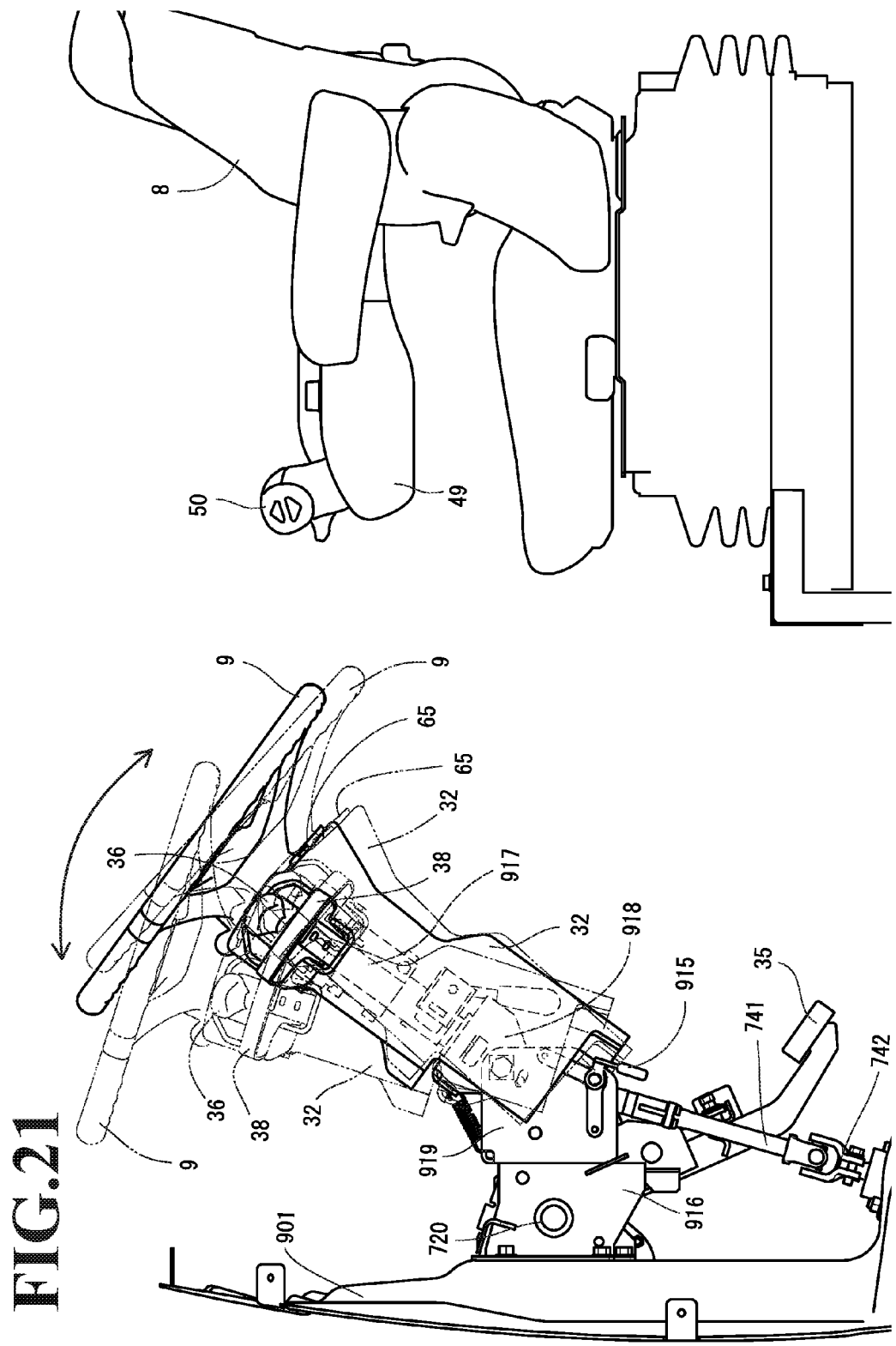
FIG. 21 is a view showing a tilt motion of the control steering wheel.

Further, the operator can release the fixation by the tilt mechanism 918 by rotating the tilt lever 915 to a near side, and can adjust an inclined position of the control steering wheel 9 by making the control steering wheel 9 rotatable around an axial center of a connection portion to the retaining bracket 919, as shown in FIG. 21. The tilt mechanism 918 can tilt the control steering wheel 9 together with the steering wheel shaft 921 by setting the connection portion between the lower end of the steering wheel shaft 921 and the universal joint to the axial center.

Since the steering column 32 is fixed to the leading end side of the telescopic mechanism 915, the steering column 32 can be moved up and down (telescopic motion) and tilted (tilt motion) together with the operation steering wheel 9. More specifically, the posture of the steering column 32 is structured such as to be changed working with the adjustment of the posture in the control steering wheel 9. Therefore, support positions of the switches 64 and 65 and the levers 36, 62, and 63 which are arranged in the upper surface side of the steering column 32 are adjusted working with the control steering wheel 9. Accordingly, the switches 64 and 65 and the levers 36, 62, and 63 can be supported at the position which are easily operated in conformity to the field of vision of the seating operator.

In the steering column 32, the forward and backward movement switching lever 36 is provided in a protruding manner in its left side surface, and the erroneous operation prevention body 38 (the reverser guard) is arranged below the forward and backward movement switching lever 36. Further, in the steering column 32, the operation levers 62 and 63 include, for example, a wiper lever driving the wiper 421 and a lever for automatic cruise traveling the work vehicle at a fixed speed, and are provided in a protruding manner in the right side surface of the steering column 32.

The DPF regeneration switch 62 is provided in the upper surface of the steering column 32 in the base portion of the control steering wheel 9, the DPF regeneration switch 62 executing the regeneration control of the exhaust gas purification device 224. More specifically, the DPF regeneration switch 62 is arranged in the field of vision of the operator when the operator is under the straight moving work posture. Therefore, the seating operator can easily view the position of the DPF regeneration switch 64 and the lighting display state in a state in which the DPF regeneration switch 62 does not get behind the control steering wheel 9 or the operation levers 36, 62, and 63.

A plurality of switches 65 such as the working switch and the one-touch automatic switch are arranged at positions which are bilaterally symmetrical about the steering wheel shaft 921 of the control steering wheel 9 in the upper surface of the steering column 32. Therefore, the seating operator can view a group of switches 65 which are arranged on the upper surface of the steering column 32 and can easily confirm the position of the working switch and the one-touch automatic switch. As a result, it is possible to reduce the erroneous operation.

The DPF regeneration switch 64, and the switches 65 such as the working switch and the one-touch automatic switch are provided on the upper surface of the steering column 32 in the base portion of the control steering wheel 9. Further, the DPF regeneration switch 64 is installed on the upper surface in one side of the steering column 32 above the brake pedal 35. Meanwhile, the switches 65 and 65 constructed by the working switch and the one-touch automatic switch are installed while having a spoke of the control steering wheel 9 arranged on the longitudinal center line of the travel machine body 2 therebetween. In the present embodiment, the switch 65 arranged in the left side is set to the working switch, and the switch 66 arranged in the right side is set to the one-touch automatic switch.

Next, a description will be given of an example of a regeneration control of the DPF 224 by the engine ECU 271 with reference to flow charts in FIGS. 22 and 23. More specifically, an algorithm (a program) shown by the flow charts in FIGS. 22 and 23 is stored in ROM of the engine ECU 271, and each of the regeneration controls mentioned above is executed by calling the algorithm to RAM and processing it by CPU.

Figure 22:
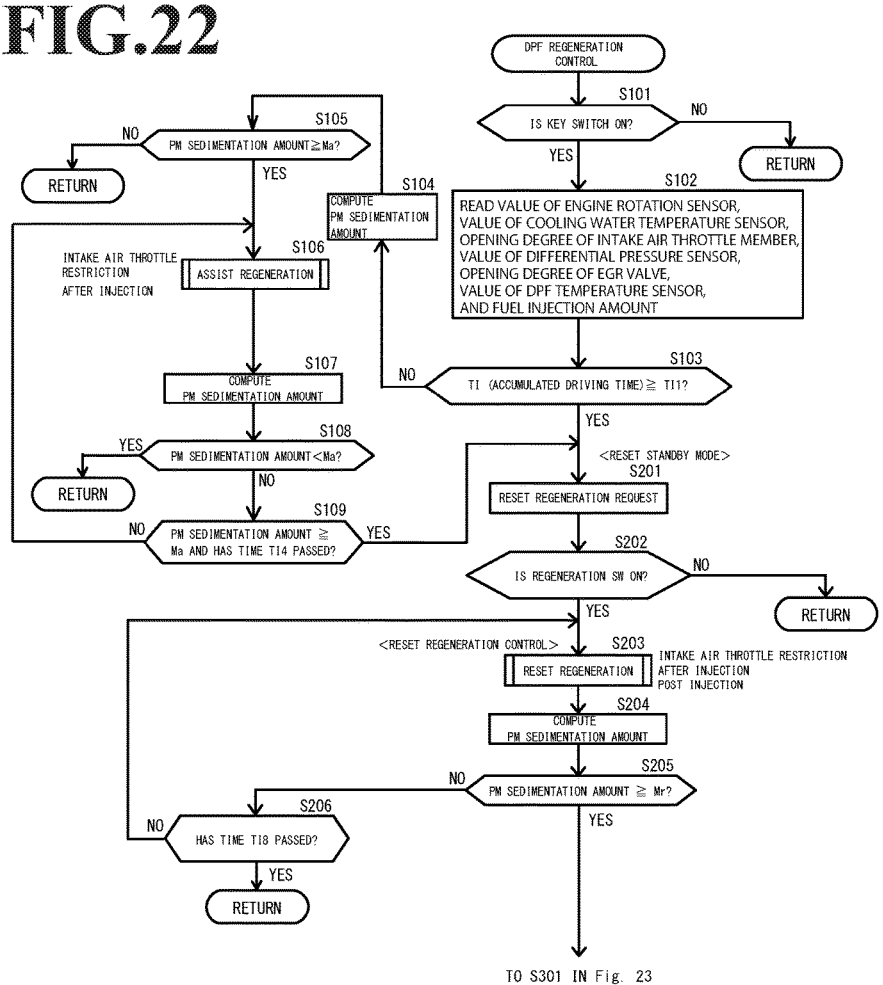
FIG. 22 is a flow chart of an assist regeneration control and a reset regeneration control.
Figure 23:
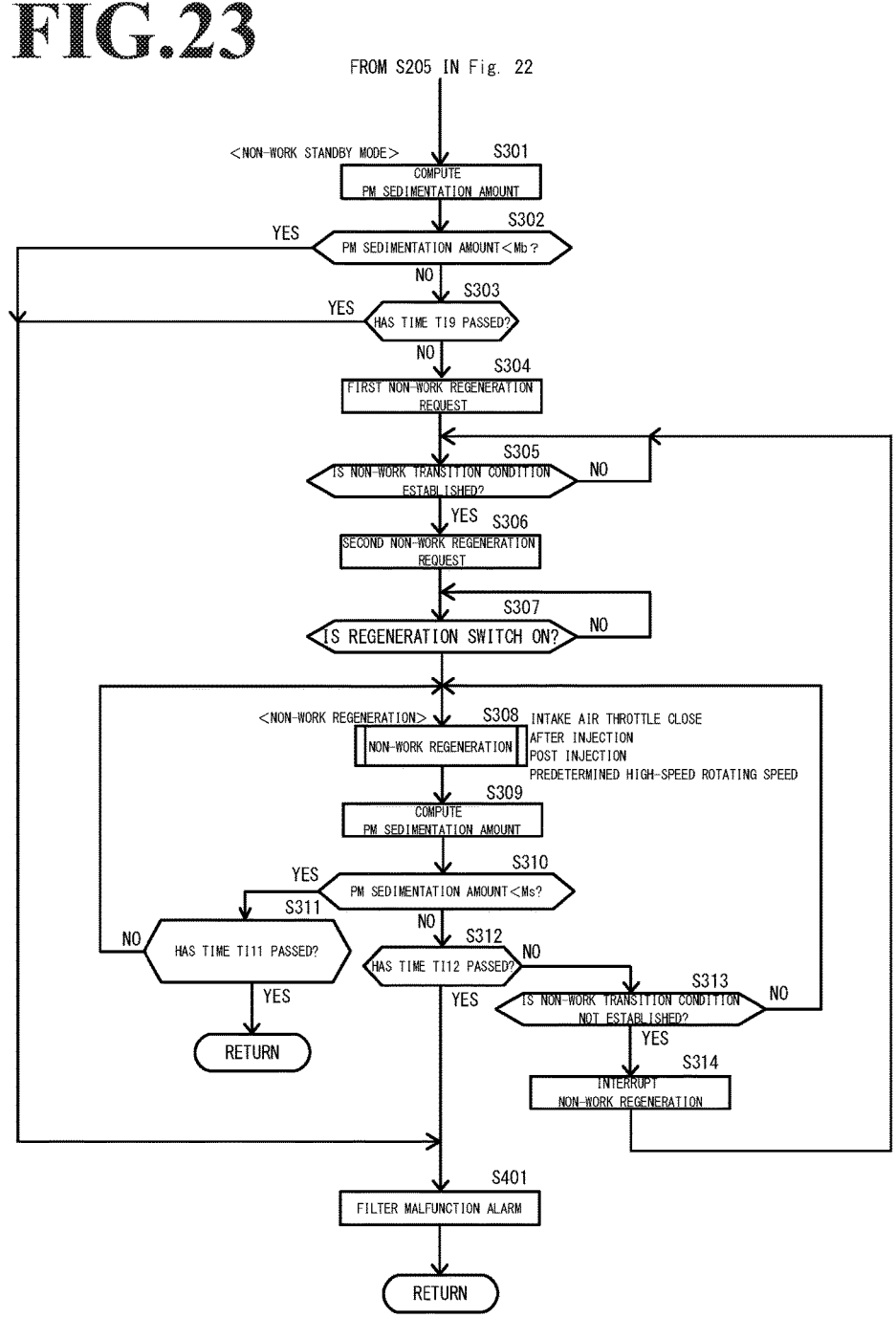
FIG. 23 is a flow chart of a non-work regeneration control.

As shown in FIG. 22, in a regeneration control of DPF 224, the step first of all reads detected values of an engine rotation sensor, a cooling water temperature sensor, a differential pressure sensor and a DPF temperature sensor, opening degrees of an intake air throttle member and an EGR valve member, and a fuel injection amount by a common rail (S102), if the key switch 61 is in an on state (S101: YES). Next, if an accumulated driving time TI from the past execution of the reset regeneration control or the non-work regeneration control is less than a set time TI1 (for example, 50 hours) (S103: NO), the step estimates a PM sedimentation amount within the DPF 224 (S104). The PM sedimentation amount estimation is carried out by using a P method which is based on the detected value of the differential pressure sensor and an exhaust gas flow rate map, and a C method which is based on the detected value of the engine rotation sensor, the fuel injection amount, a PM discharge amount map, and an exhaust gas flow rate map. If the PM sedimentation amount is equal to or more than a defined amount Ma (for example, 8 g/l) (S105: YES), the step executes an assist regeneration control (S106).

When the assist regeneration control is carried out, the step estimates the PM sedimentation amount within the DPF 224 on the basis of the detected value of the engine rotation sensor, the fuel injection amount, the PM discharge amount map, and the exhaust gas flow rate map (S107). If the PM sedimentation amount is less than the defined amount Ma (for example, 6 g/l) (S108: YES), the step finishes the assist regeneration control and goes back to the normal drive control. In the case that the PM sedimentation amount is equal to or more than the defined amount Ma (S108: NO), the step makes a transmission to a step S201 which is a reset standby mode before the reset regeneration control, if a predetermined time TI4 (for example, 10 minutes) has passed in this state (S109: YES).

In the case that the step goes back to the step S103 and the accumulated driving time TI is equal to or more than the set time TI1 (S103: YES), the step makes a transition to the step S201 which is the reset standby mode, and executes the reset regeneration request. In this stage, the regeneration lamp 912 and the regeneration switch 64 flash at a low speed (for example, 0.5 Hz), and a warning buzzer intermittently sounds at a low speed (for example, 0.5 Hz). At this time, the meter ECU 904 receives a command signal (a regeneration control request output) for executing the reset regeneration request from the engine ECU 271 through a CAN communication bus. The step sounds the warning buzzer at the low speed at the same time of flashing the regeneration lamp 912 at the low speed. Further, the step flashes the regeneration switch 64 at the low speed.

Further, in the step S201, the meter ECU 904 may display an operation command sign of character data "please hold down the regeneration switch", for example, on the liquid crystal panel 908, by switching the screen display of the liquid crystal panel 908 to a display on the basis of the reset regeneration request information prompting the execution of the reset regeneration control. Thereafter, in the case that the regeneration switch 64 is turned on for a predetermined time (for example, 3 seconds) (S202: YES), the step executes the reset regeneration control (S203). In this stage, the step turns on lights of the regeneration lamp 912 and the regeneration switch 64, and stops sounding the warning buzzer. Further, the screen display of the liquid crystal panel 908 may be transited from the reset regeneration request information to the reset regeneration execution information on the basis of the informing sign such as the character data "under reset regeneration".

The step estimates the PM sedimentation amount within the exhaust gas filter 50 (S204) during the execution of the reset regeneration control. In the case that the PM sedimentation amount is in a state of being less than a defined amount Mr (for example, 10 g/l) (S205: NO), the step finishes the reset regeneration control and goes back to the normal drive control if a predetermined time TI8 (for example, 30 minutes) has passed after the start of the reset regeneration control (S206: YES). At this time, the step turns off lights of the regeneration lamp 912 and the regeneration switch 64 for finishing the reset regeneration control. Further, in the case that the reset regeneration execution information is displayed on the liquid crystal panel 908, the screen display of the liquid crystal panel 908 is transited from the reset regeneration execution information to the normal information. On the other hand, if the PM sedimentation amount is equal to or more than the defined amount Mr (S205: YES), the reset regeneration control is assumed to be unsuccessful, and there is a risk of having a possibility of the PM excessive sedimentation. Therefore, the step makes a transition to a step S301 which is a parking standby mode before the non-work regeneration control.

As shown in FIG. 23, in the parking standby mode, the step first of all estimates the PM sedimentation amount within the DPF 224 (S301). Further, if the PM sedimentation amount is less than a defined amount Mb (for example, 12 g/l) (S302: NO) and within a predetermined time TI9 (for example, 10 hours) (S303: NO), the step executes a first non-work regeneration request (S304). In this stage, the regeneration switch lamp 345 keeps turning off the light, however, the regeneration lamp 912 and the engine malfunction lamp 912 flash at a high speed (for example, 1.0 Hz), and the warning buzzer intermittently sounds at a high speed (for example, 1.0 Hz). Further, as shown by a flow chart in FIG. 16 mentioned later, the screen display of the liquid crystal panel 908 may be switched to a display of a first non-work regeneration request index which preannounces the execution of the non-work regeneration control. The first non-work regeneration request index is structured, for example, such as to alternately switch and display the character data "stop agricultural portion" and the character data "park at safe place".

On the other hand, in the case that the PM sedimentation amount is equal to or more than the defined amount Mb (S302: YES), or the predetermined time TI9 (for example, 10 hours) has passed under the parking standby mode (S303: YES), there is a risk of having a possibility of the PM excessive sedimentation. Therefore, the step informs of the malfunction of the DPF 224 (STEP 401). At this time, the engine malfunction lamp 912 flashes at a high speed (for example, 1.0 Hz), and the warning buzzer sounds at a high speed (for example, 1.0 Hz). Meanwhile, the regeneration lamp 912 and the regeneration switch 64 keep turning off the lights. Further, the screen display of the liquid crystal panel 908 may be structured such as to be switched to a display of a malfunction warning sign which alternately changes the character data "exhaust gas filter malfunction" and the character data "communicate with sale store".

After the execution of the first non-work regeneration request in the step S304 mentioned above, the step stands ready until a preset non-work regeneration transition condition (an interlock release condition) is established (S305). The non-work regeneration transition condition shown in the step S305 is constructed by a neutral position of the forward and backward movement potentiometer (a neutral state of the forward and backward movement switching lever 36), an on state of the parking brake switch (a lock state by the parking brake lever 43), an off state of the PTO clutch switch 53, a low-idle rotational speed of the engine 5 (a minimum limit rotational speed under the no-load time), and a predetermined value (for example, 65° C.) or more of the detected value of the cooling water temperature sensor (an end of warming-up operation in the engine 5).

If the non-work regeneration transition condition (the interlock release condition) is established (YES) in the step S305, the step executes a second non-work regeneration request (S306). In this stage, the regeneration lamp 912 and the regeneration switch 64 flash at a low speed (for example, 0.5 Hz), the engine malfunction lamp 912 flashes at a high speed (for example, 1.0 Hz), and the warning buzzer is switched to an intermittent low-speed sound (for example, 0.5 Hz). Further, as shown by a flow chart in FIG. 16 mentioned later, the screen display of the liquid crystal panel 908 may be structured such as to be transited to the display on the basis of the second non-work regeneration request information prompting the execution of the non-work regeneration control. More specifically, the operation command sign of the character data "please hold down the regeneration switch" is displayed on the liquid crystal panel 908 in the same manner as the display on the basis of the reset regeneration request information in the step S201.

Further, if the regeneration switch 64 is turned on for a predetermined time (S307: YES), the step executes the non-work regeneration control (S308). More specifically, when the meter ECU 904 notifies the engine ECU 271 of reception of the on operation to the regeneration switch 64 from the operator, the engine controller 271 executes the non-work regeneration control. In this stage, the step turns on the lights of the regeneration lamp 912, the regeneration switch 64, and the engine malfunction lamp 912, and stops sounding the warning buzzer. As a result, the operator recognizes that the non-work regeneration control is executed, and it is possible to previously inhibit an erroneous operation of the operator when the non-work regeneration control is executed.

Figure 24:
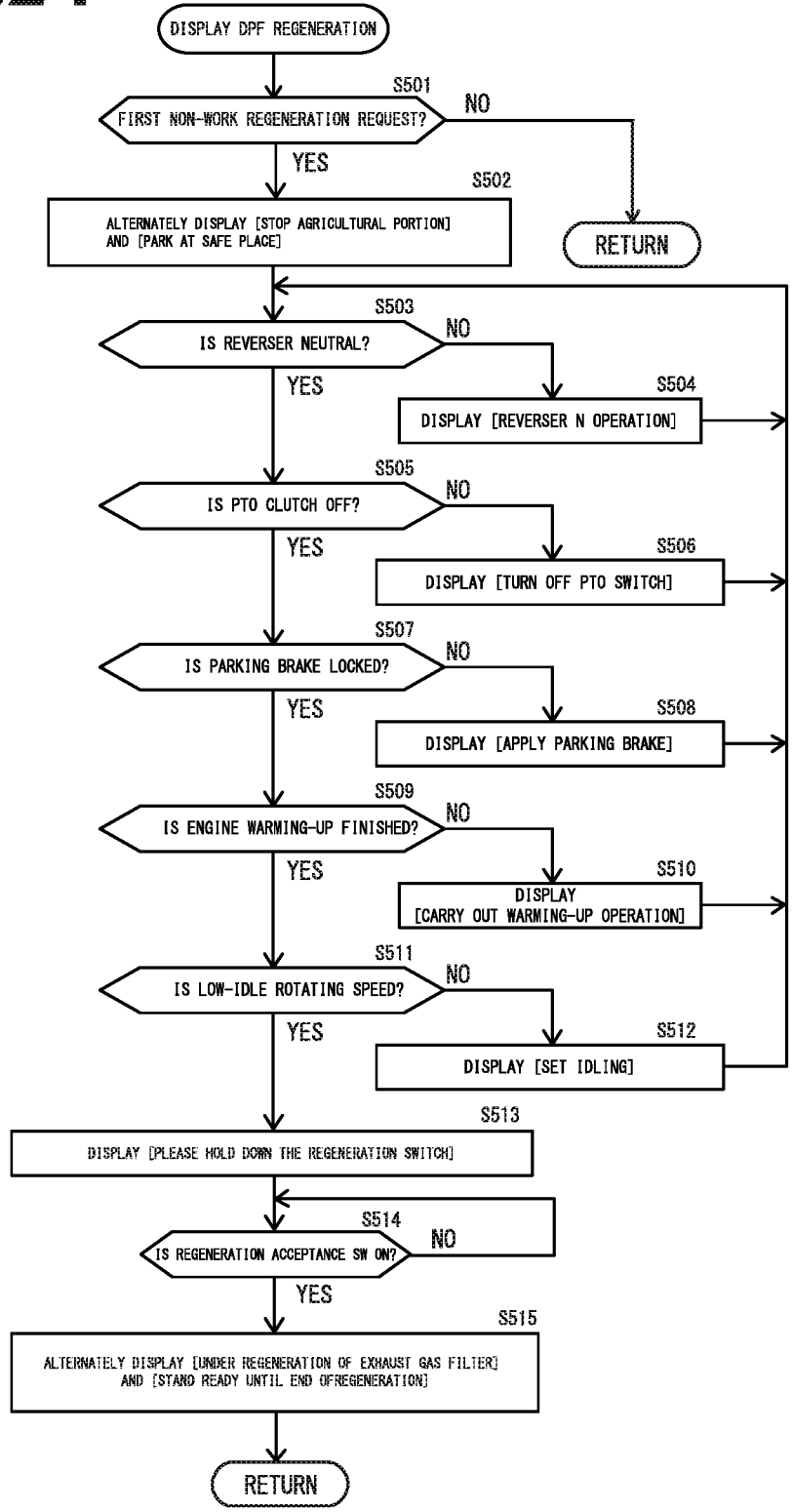
FIG. 24 is a flow chart showing a timing of a character representation at the non-work regeneration control time.

Further, as shown by a flow chart in FIG. 24 mentioned later, the screen display of the liquid crystal panel 908 may be transited from the second non-work regeneration request information to the non-work regeneration execution information. Specifically, the non-work regeneration informing sign of alternately switching the character data "under regeneration of exhaust gas filter" and the character data "stand ready until end of regeneration" is displayed on the liquid crystal panel 908. More specifically, it is possible to previously inhibit the erroneous operation of the operator by structuring such as to display the matter that the operation of the present machine is inhibited until the regeneration control is finished.

During the execution of the non-work regeneration control, the step estimates the PM sedimentation amount within the DPR 224 (S309). If the PM sedimentation amount is less than a defined amount Ms (for example, 8 g/l) (S310: YES), and a predetermined time TI11 (for example, 30 minutes) has passed after the start of the non-work regeneration control (S311: YES), the step finishes the non-work regeneration control, and goes back to the normal drive control. In the case that the PM sedimentation amount is equal to or more than the defined amount Ms (S310: NO), the step assumes failure of the non-work regeneration control if a predetermined time TI12 (for example, 30 minutes) has passed under the state (S312: YES). Since there is a risk of having a possibility of the PM excessive sedimentation, the step makes a transition to a step S401 of informing of the malfunction of the exhaust gas filter 50.

In a state in which the non-work regeneration transition condition (the interlock release condition) is not established (S313: YES) due to the release of the lock state by the parking brake lever 43 during the execution of the non-work regeneration control, the step makes a transition to a step S304 and executes the first non-work regeneration request after interruption of the non-work regeneration control (S314). The step S312 is structured such as to determine whether or not the non-work regeneration control is interrupted on the basis of the state of non-establishment in the non-work regeneration transition condition (the interlock release condition), however, may be structured such as to interrupt the non-work regeneration control in the case that the regeneration switch 64 is pushed down during the execution of the non-work regeneration control. As a result, the non-work regeneration control of the DPF 224 can be interrupted without any troublesome operation such as the operation of stopping the engine 5 and interrupting the non-work regeneration control of the DPF 224.

A description will be given below of a display motion of the liquid crystal panel 908 when executing the non-work regeneration control, according to a flow chart in FIG. 24. When the meter ECU 904 receives the first non-work regeneration request from the engine ECU 271 in the step S304 (S501: YES), the meter ECU 904 displays the first non-work regeneration request index which alternately switches and displays the character data "stop agricultural portion" and the character data "park in safe place" on the liquid crystal panel 908 (S502). Further, the meter ECU 904 checks whether or not the forward and backward movement switching lever 36 is in a neutral state (S503). In the case that the forward and backward movement switching lever 36 is in a forward movement side or a backward movement side (S503: NO), the step displays an operation index on the basis of the character data "set reverser neutral" on the liquid crystal panel 908 for urging the operator to set the forward and backward movement switching lever 36 to the neutral state (S504).

Next, the meter ECU 904 checks on the basis of the signal from the PTO clutch switch 53 whether or not the PTO clutch switch 53 is in the off state (S505). In the case that the PTO clutch switch 53 is in the on state (S505: NO), the step displays an operation index on the basis of the character data "turn off PTO switch" on the liquid crystal panel 908 for urging the operator to turn off the PTO clutch switch 53 (S506).

Next, the meter ECU 904 checks whether or not the lock state is established by the parking brake lever 43 (S507). In the case that the parking brake switch is in the off state (S507: NO), the step displays an operation index on the basis of the character data "apply parking brake" on the liquid crystal panel 908 for urging the operator to set the lock state by the parking brake lever 43 (S508).

Next, the meter ECU 904 communicates with the engine ECU 271, and checks on the basis of the signal from the cooling water temperature sensor whether or not the warming-up operation of the engine 5 is finished (S509). In the case that the detected value by the cooling water temperature sensor is less than a predetermined value (for example, 65° C.) (S509: NO), the step displays an operation index on the basis of the character data "carry out warming-up operation" on the liquid crystal panel 908 for urging the operator to finish the warming-up operation of the engine 5 (S510).

Next, the meter ECU 904 communicates with the engine ECU 271, and checks on the basis of the signal from the engine rotation sensor whether or not the engine 5 is in a low idle rotational speed (S511). In the case that the engine 5 is not operated at the low idle rotational speed (S511: NO), the step displays an operation index on the basis of the character data "set idling" on the liquid crystal panel 908 for urging the operator to operate the engine 5 in the low idle (S512). In the case that all the conditions in the steps S503, S505, S507, S509, and S511 mentioned above are satisfied, the non-work regeneration transition condition is established. As a result, the step executes the second non-work regeneration request in the step S306 mentioned above, and displays the operation command sign on the basis of the character data "please hold down the regeneration switch" on the liquid crystal panel 908 (S513).

Thereafter, the step determines whether or not the operation of holding down the regeneration switch 64 is carried out (S514), in the same manner as the step S307 mentioned above. At this time, if the regeneration switch 64 is turned on for a predetermined time (S514: YES), the non-work regeneration informing sign alternately switching the character data "under regeneration of exhaust gas filter" and the character data "stand ready until end of regeneration" is displayed on the liquid crystal panel 908 (S515).

Figure 26:
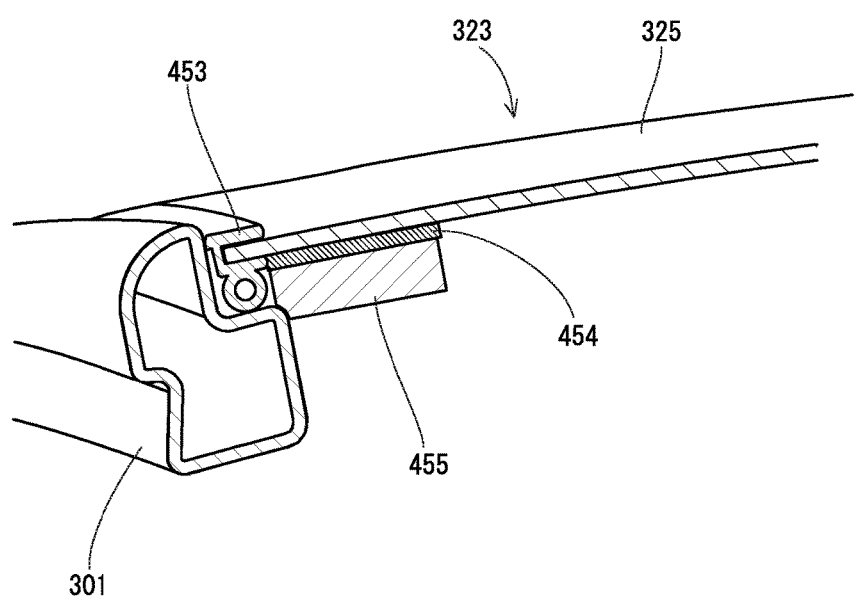
FIG. 26 is a cross sectional view as seen from a line XXVI-XXVI in FIG. 13.

Next, a description will be given of details of a structure of a pair of right and left side doors 323 in the right and left side portions of the cabin 7 with reference to FIG. 26. As shown in FIGS. 1 and 2, a side door glass body 325 made of a transparent glass is arranged in right and left side surfaces of the cabin frame 300, as the side door 323 which closes an operator platform portion in the right and left sides of the cabin 7 so as to be openable and closable. A weather strip 453 made of an elastic rubber is attached to a peripheral edge portion of the side door glass body 325 over a whole periphery of the side door glass body 325. A blinder portion 454 formed by painting or taping is provided in an inner surface side of the side door glass body 325 so as to surround an inner peripheral side of the weather strip 453. A sound absorbing material 455 made of urethane foam is bonded to the blinder portion 454 by an adhesive agent. Therefore, the sound absorbing material 455 is attached over a whole periphery of the side door glass body 325 in the same manner as the weather strip 453.

In a state in which the side door 323 is closed, both of the weather strip 453 and the sound absorbing material 455 come into contact with the cabin frame 300 from an outer side. More specifically, the corresponding portion to the front edge side of the side door glass body 325 in the weather strip 453 and the sound absorbing material 455 comes into contact with the front support post 301, the corresponding portion to the upper edge side of the side door glass body 325 comes into contact with the side beam member 305, and the corresponding portion to the rear edge side of the side door glass body 325 comes into contact with the rear support post 302. The corresponding portion to the lower edge side of the side door glass body 325 comes into contact with a fender frame (not shown) which connects the lower end side of the front support post 301 and the lower end side of the rear support post 302.

According to the structure mentioned above, it is possible to effectively suppress intrusion of noise into the cabin 7 via an outer peripheral side of the side door from the external portion, on the basis of the existence of the sound absorbing material 455 which comes into contact with the cabin frame 300 when the side door 323 is closed, and it is possible to improve a sound proofing function of the cabin 7.

Figure 27:
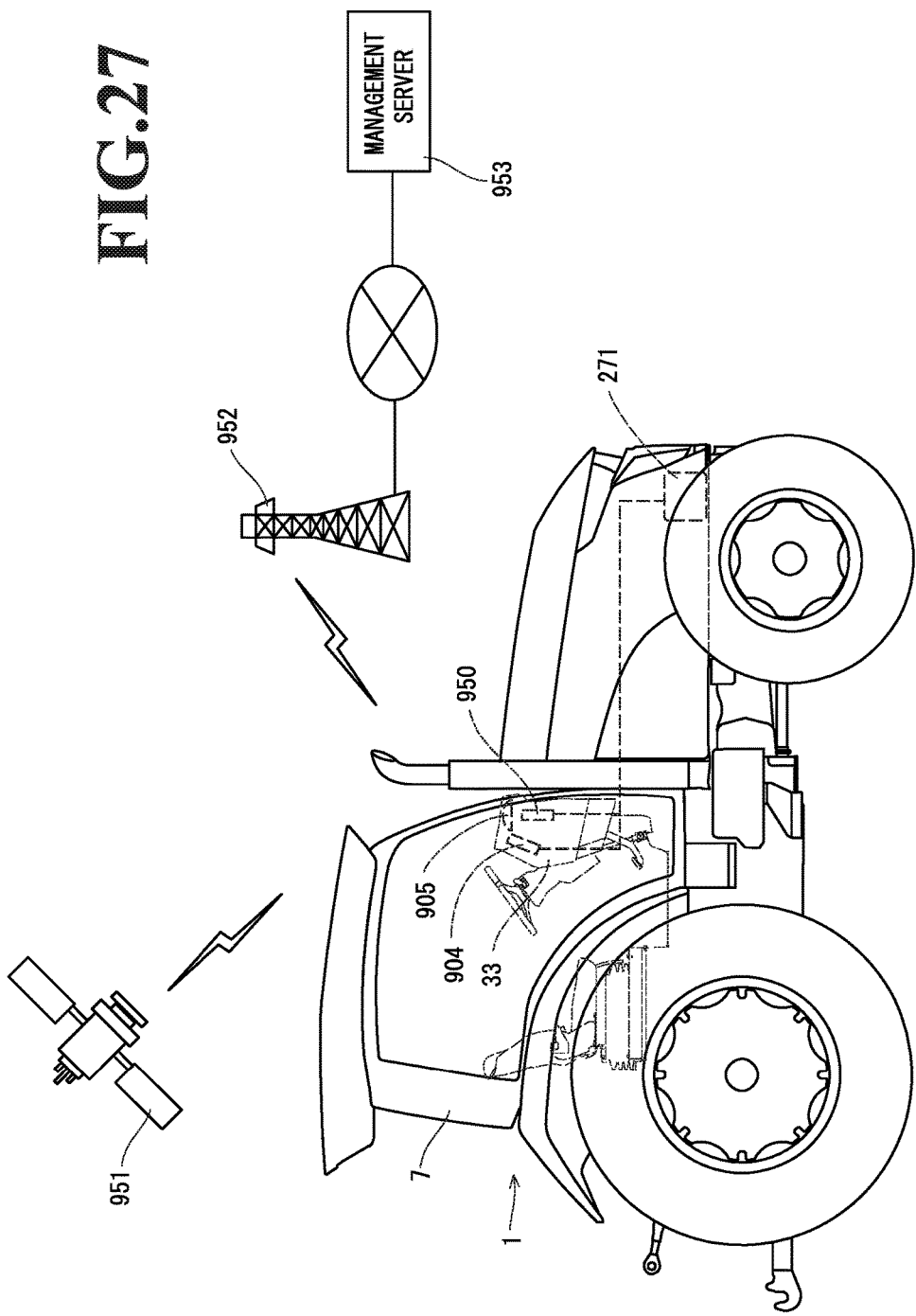
FIG. 27 is a schematically explanatory view showing a structure of a communication network including the tractor.

Further, as shown in FIG. 27, the engine ECU 271 and the meter ECU 904 are structured such as to be communicable with the communication terminal device 950 through the CAN communication bus. As a result, the communication terminal device 950 receives the signals from the engine ECU 271 and the meter ECU 904, and recognizes an operating state and a condition of the tractor 1. Further, the communication terminal device 950 is connected to the GPS antenna 905, and specifies the current position of the tractor 1 by communicating with the artificial satellite 951 through the GPS antenna 905. Further, the communication terminal device 950 is structured such as to be communicable with a base station 952 in a communication line network (a wireless LAN or a phone line) by a built-in antenna (not shown), and transmits the current position of the tractor 1 and the operating state and the condition of the tractor 1 to a management server 953 through the base station 952.

Since the tractor 1 is provided with a self position checking function on the basis of the GPS antenna 905 and the communication terminal device 950 as mentioned above, the tractor 1 can check an optional farm field which is not worked, by having access to the management server 953, for example, in the case that the management server 953 is made good use as a management information database for a plurality of farm fields to be managed. As a result, a plurality of workers can efficiently execute the agricultural work in a plurality of farm fields, and it is possible to save labor for the agricultural work. Further, since the manufacturer or the seller checks the operating state or the condition of the tractor 1 through the management server 953, the manufacturer or the seller can be in touch with the operator of the tractor 1 which is necessary to be maintained, and can dispatch the worker executing the maintenance work by checking the position of the tractor 1 which is necessary to be maintained.

Figure 28:
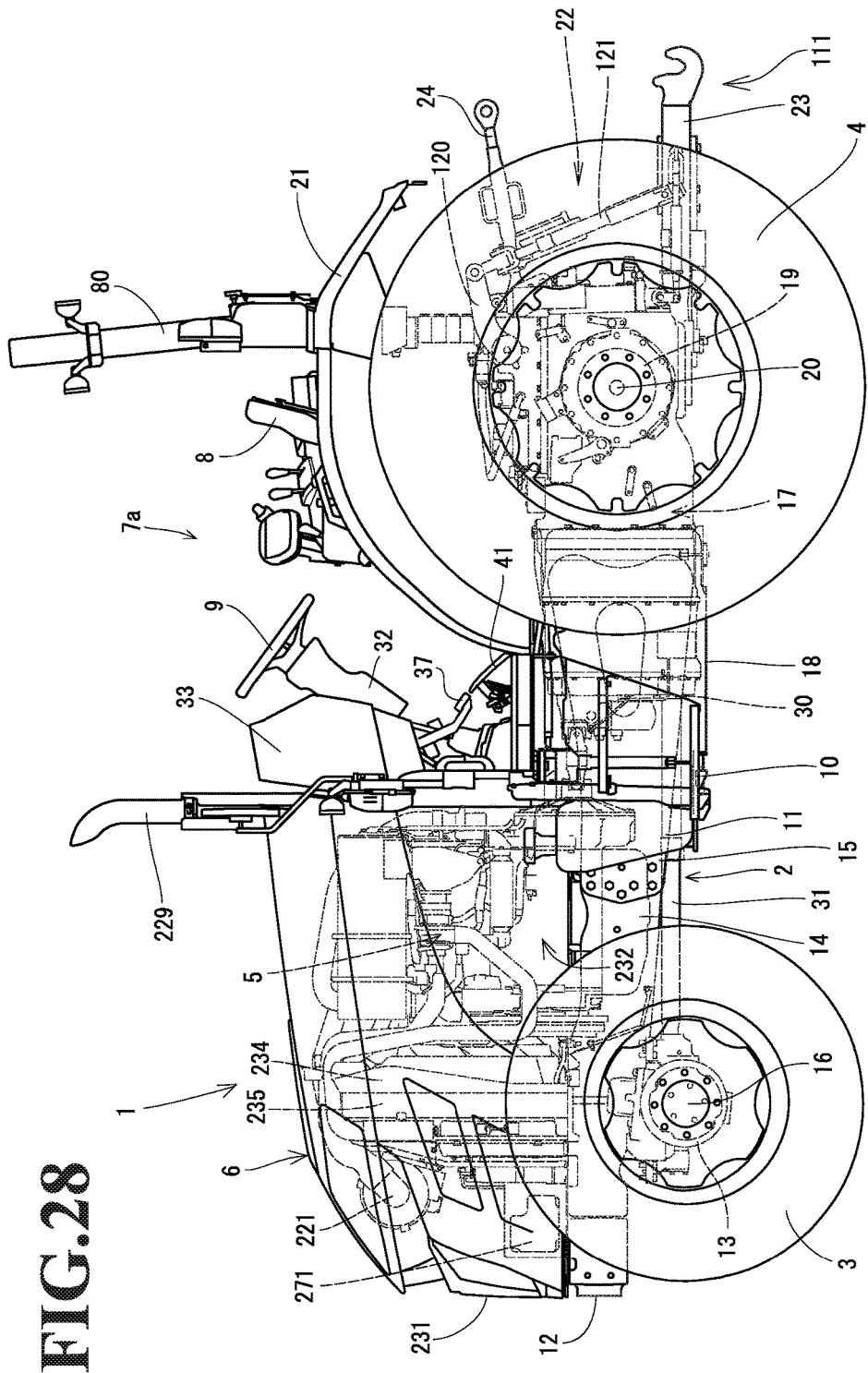
FIG. 28 is a left side elevational view of a tractor according to the other embodiment.
Figure 29:
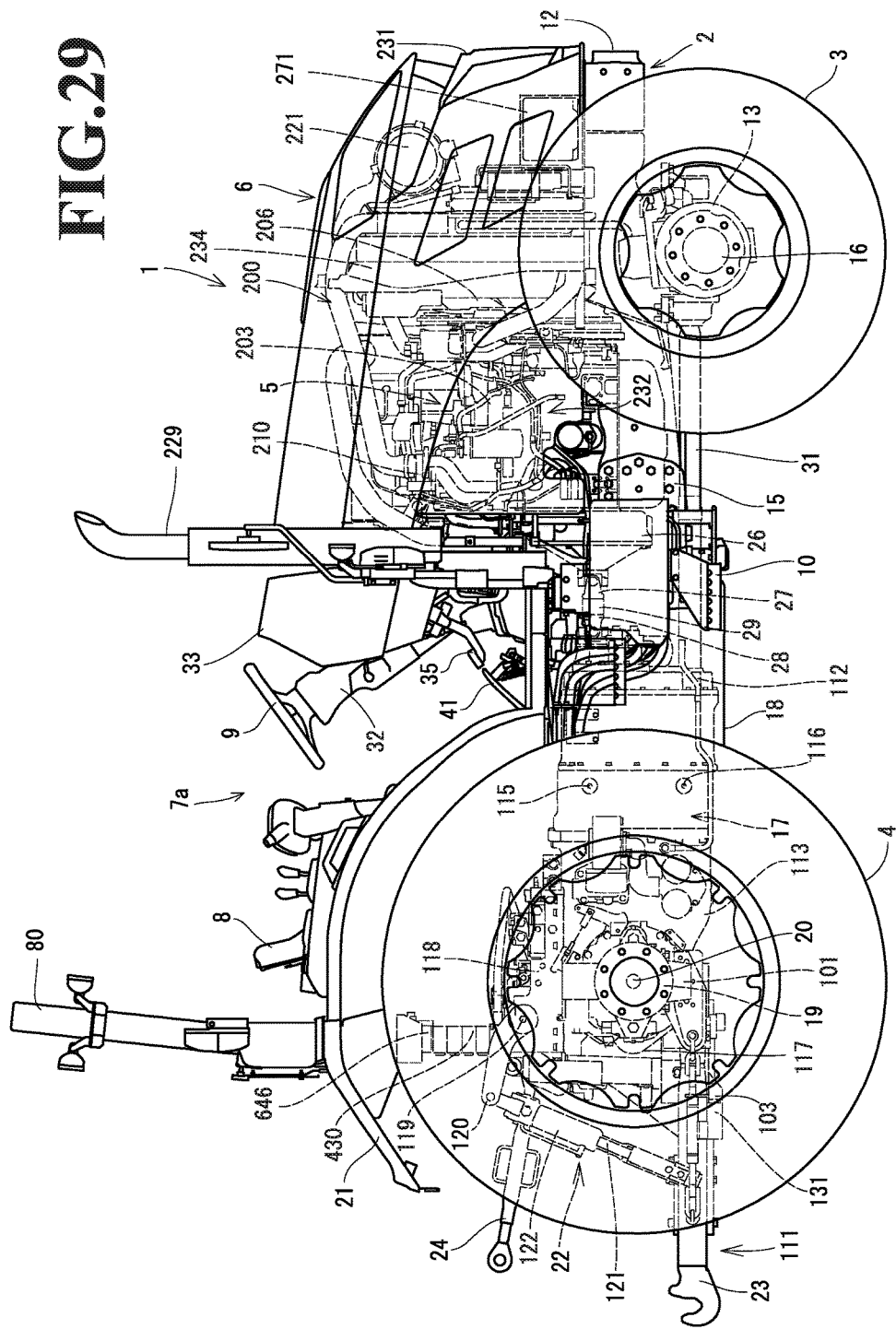
FIG. 29 is a right side elevational view of the tractor according to the other embodiment.
Figure 30:
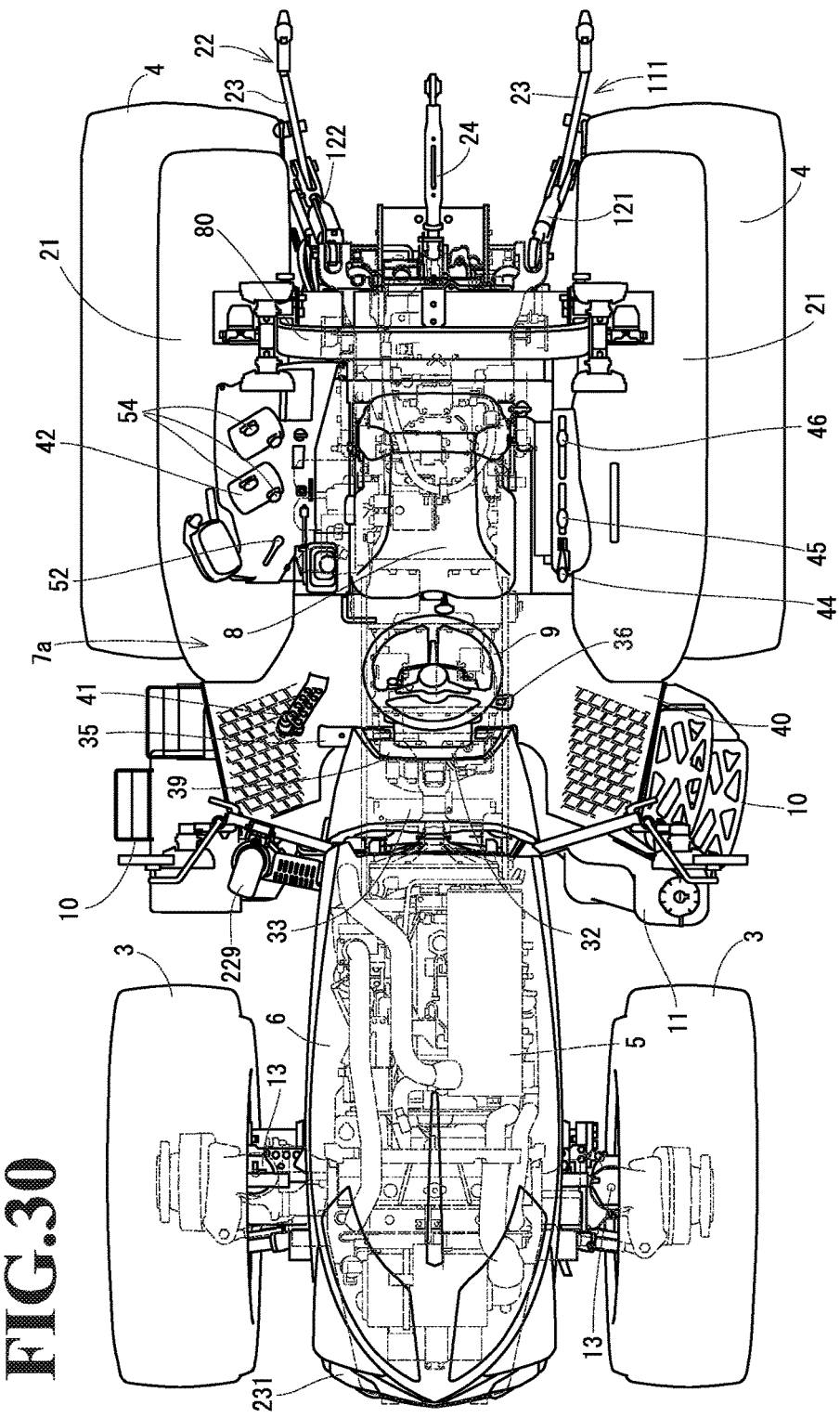
FIG. 30 is a plan view of the tractor according to the other embodiment.

A description will be given below of a work vehicle according to the other embodiment with reference to FIGS. 28 to 31. FIG. 28 is a left side elevational view of a tractor 1, FIG. 29 is a right side elevational view of the same, and FIG. 30 is a plan view of the same. As shown in FIGS. 28 to 30, a travel machine body 2 in the tractor 1 is supported by a pair of right and left front wheels 3 and a pair of right and left rear wheels 4. The tractor 1 travels forward or travels backward by driving the rear wheels 4 and the front wheels 3 by a diesel engine 5 which is mounted to a front portion of the travel machine body 2. An upper side of the diesel engine 5 is covered with a hood 6 which can be opened and closed. Further, an operating portion 7a is provided in a rear side of the hood 6 in the upper surface of the travel machine body 2, and a control seat 8 and a control steering wheel 9 are installed in the operating portion 7a, the control seat 8 on which an operator seats, and the control steering wheel 9 which controls to steer the front wheels 3. Further, a boarding step 10 by which the operator gets on board is provided in the operating portion 7a.

Further, as shown in FIGS. 28 to 30, the travel machine body 2 is constructed by an engine frame 14 which has a front bumper 12 and a front axle case 13, and a machine body frame 15 which is connected to the engine frame 14, and fixes a transmission case 17 by the machine body frame 15. The rotation of the diesel engine 5 is shifted by the transmission case 17 and is transmitted to the rear wheels 4 or the front wheels 3. In addition, a rear axle case 19 is protruded outward from right and left side surfaces of the transmission case 17, and the rear wheels 4 are attached to the rear axle case 19. A ROPS frame 80 is provided in a rising manner in the rear axle case 19.

A dash board 33 is arranged at a position which is at the back of the hood 8 in front of the control seat 8, and the control steering wheel 9 for controlling to steer is rotatably provided in a rising manner in an upper surface side of a steering column 32 which is surrounded by the dash board 33. The dash board 33 is fixed to a back surface of an air-cut plate 901 which covers a rear side of the engine 5 within the hood 6.

As shown in FIG. 31, a communication terminal device 950 and a GPS antenna 905 are fixed to a back surface of the air-cut plate 901, and the communication terminal device 950 and the GPS antenna 905 are installed within the dash board 33. As mentioned above, even in the structure in which the operating portion 7a is not covered with the cabin, it is possible to prevent access by a third person from an external portion by accommodating the communication terminal device 950 and the GPS antenna 905 within the dash board 33, for example, it is possible to prevent disconnection of an electric wiring between the communication terminal device 950 and the GPS antenna 905 and steal thereof.

Further, a meter panel 906 is fixed to the dash board 33, a meter controller 904 electrically connected to the meter panel 906 is constructed integrally with the meter panel 906, and the meter controller 904 is arranged within the dash board 33 so as to face to the communication terminal device 950. The meter controller 904 can be compactly installed within the dash board 33 together with the communication terminal device 950 and the GPS antenna 905, and is not exposed to rain water or dusts by being covered with the dash board 33. As a result, failure of the meter controller 904 can be prevented.

The structure of each of the portions in the present invention is not limited to the illustrated embodiment, but can be variously modified within the range which does not deflect from the scope of the present invention.

The embodiments of the present invention relates to a work vehicle such as a tractor for an agricultural work or a wheel loader for a civil engineering work which tows a ground working machine such as a tilling working machine or a seeding working machine.

What is claimed is:

1. A work vehicle comprising: an antenna which executes communication external of the vehicle; a communication terminal device which is electrically connected to the antenna; a dash board; and a steering column, wherein the antenna and the communication terminal device are arranged within the dash board and wherein the steering column extends through the dashboard and a control steering wheel is arranged on the steering column, and wherein a heat shield plate is provided in a front surface side of the steering column, and the antenna and the communication terminal device are attached to the heat shield plate, the work vehicle further comprising a meter panel fixed to the dash board, wherein the antenna is disposed in a space lying between a top face of the dash board, the meter panel and the heat shield plate, in a side view of the work vehicle, and wherein the dashboard is arranged so as to cover the antenna and the communication terminal device.

2. The work vehicle according to claim 1, wherein a meter controller electrically connected to the meter panel is integrally constructed with the meter panel, and the meter controller is arranged within the dash board so as to face to the communication terminal device.

3. The work vehicle according to claim 1, further comprising a DPF (diesel articulate filter) regeneration switch, a working switch, and a one-touch automatic switch,
wherein the DPF regeneration switch is provided on an upper surface of the steering column, whereby the DPF regeneration switch is arranged in a field of vision of a forward facing operator.

4. The work vehicle according to claim 3, wherein the working switch and the one-touch automatic switch are arranged on the upper surface of the steering column which is bilaterally symmetrical about the control steering wheel shaft, in the upper surface of the steering column.

5. The work vehicle according to claim 1, further comprising a tilt lever and a telescopic lever which adjust a posture of the control steering wheel,
wherein the tilt lever and the telescopic lever are arranged at respective right and left sides of the steering column.

* * * * *